United States Patent
Schwarz et al.

(10) Patent No.: US 10,234,935 B2
(45) Date of Patent: Mar. 19, 2019

(54) MEDIATION OF INTERACTION METHODOLOGIES IN IMMERSIVE ENVIRONMENTS

(71) Applicant: MICROSOFT TECHNOLOGY LICENSING, LLC, Redmond, WA (US)

(72) Inventors: Julia Schwarz, Redmond, WA (US); James Tichenor, Seattle, WA (US); Yasaman Sheri, Seattle, WA (US); David J. Calabrese, Bellevue, WA (US); Bharat Ahluwalia, Redmond, WA (US); Robert Pengelly, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 104 days.

(21) Appl. No.: 15/234,805

(22) Filed: Aug. 11, 2016

(65) Prior Publication Data

US 2018/0046245 A1 Feb. 15, 2018

(51) Int. Cl.
*G06F 3/01* (2006.01)
*G02B 27/00* (2006.01)
*G02B 27/01* (2006.01)
*G06F 3/00* (2006.01)
*G06F 3/16* (2006.01)
(Continued)

(52) U.S. Cl.
CPC .......... *G06F 3/011* (2013.01); *G02B 27/0093* (2013.01); *G02B 27/017* (2013.01); *G06F 3/005* (2013.01); *G06F 3/017* (2013.01); *G06F 3/16* (2013.01); *G06T 19/006* (2013.01); *G06T 19/20* (2013.01); *G06T 2219/024* (2013.01)

(58) Field of Classification Search
CPC .......... G06F 3/011; G06F 3/005; G06F 3/017; G06F 3/16; G02B 27/0093; G02B 27/017; G06T 19/006; G06T 19/20; G06T 2219/024

See application file for complete search history.

(56) References Cited

U.S. PATENT DOCUMENTS

| | | | |
|---|---|---|---|
| 8,319,773 | B2 | 11/2012 | Fein et al. |
| 9,158,375 | B2 | 10/2015 | Maizels et al. |
| 9,202,306 | B2 | 12/2015 | Vesely et al. |

(Continued)

OTHER PUBLICATIONS

"International Search Report and Written Opinion Issued in PCT Application No. PCT/US2017/045208", dated Oct. 23, 2017, 14 Pages.

(Continued)

*Primary Examiner* — Peter D McLoone
(74) *Attorney, Agent, or Firm* — Alleman Hall Creasman & Tuttle LLP

(57) ABSTRACT

In various embodiments, computerized methods and systems for mediating interaction methodologies with virtual objects rendered in an immersive environment are provided. An intended target is identified from one or more virtual objects rendered in an at least partially-virtual environment. A relative proximity of the intended target to the user, or an extension of the user, is determined. An interaction methodology is selected for interaction with the intended target based on the determined relative proximity to the intended target, among other things. An indication of the selected interaction methodology is then provided to the user.

20 Claims, 22 Drawing Sheets

(51) Int. Cl.
G06T 19/00 (2011.01)
G06T 19/20 (2011.01)

(56) References Cited

U.S. PATENT DOCUMENTS

2014/0033052 A1   1/2014   Kaufman et al.
2014/0152558 A1   6/2014   Salter et al.
2014/0320389 A1   10/2014  Scavezze et al.
2016/0027216 A1   1/2016   da Veiga et al.

OTHER PUBLICATIONS

Poupyrev, et al., "The Go-Go Interaction Technique: Non-Linear Mapping for Direct Manipulation in VR", In Proceedings of the 9th Annual ACM Symposium on User Interface Software and Technology, Nov. 6, 1196, pp. 79-80.

Hilliges, et al., "HoloDesk: Direct 3D Interactions with a Situated See-Through Display", In Proceedings of the SIGCHI Conference on Human Factors in Computing Systems, May 5, 2012, pp. 2421-2430.

Kovács, et al., "Tangible Holographic 3D Objects with Virtual Touch", In Proceedings of the International Conference on Interactive Tabletops & Surfaces, Nov. 15, 2015, pp. 319-324.

McMahan, et al., "Principles for Designing Effective 3D Interaction Techniques", In Publication of CRC Press, Sep. 10, 2014, pp. 285-311.

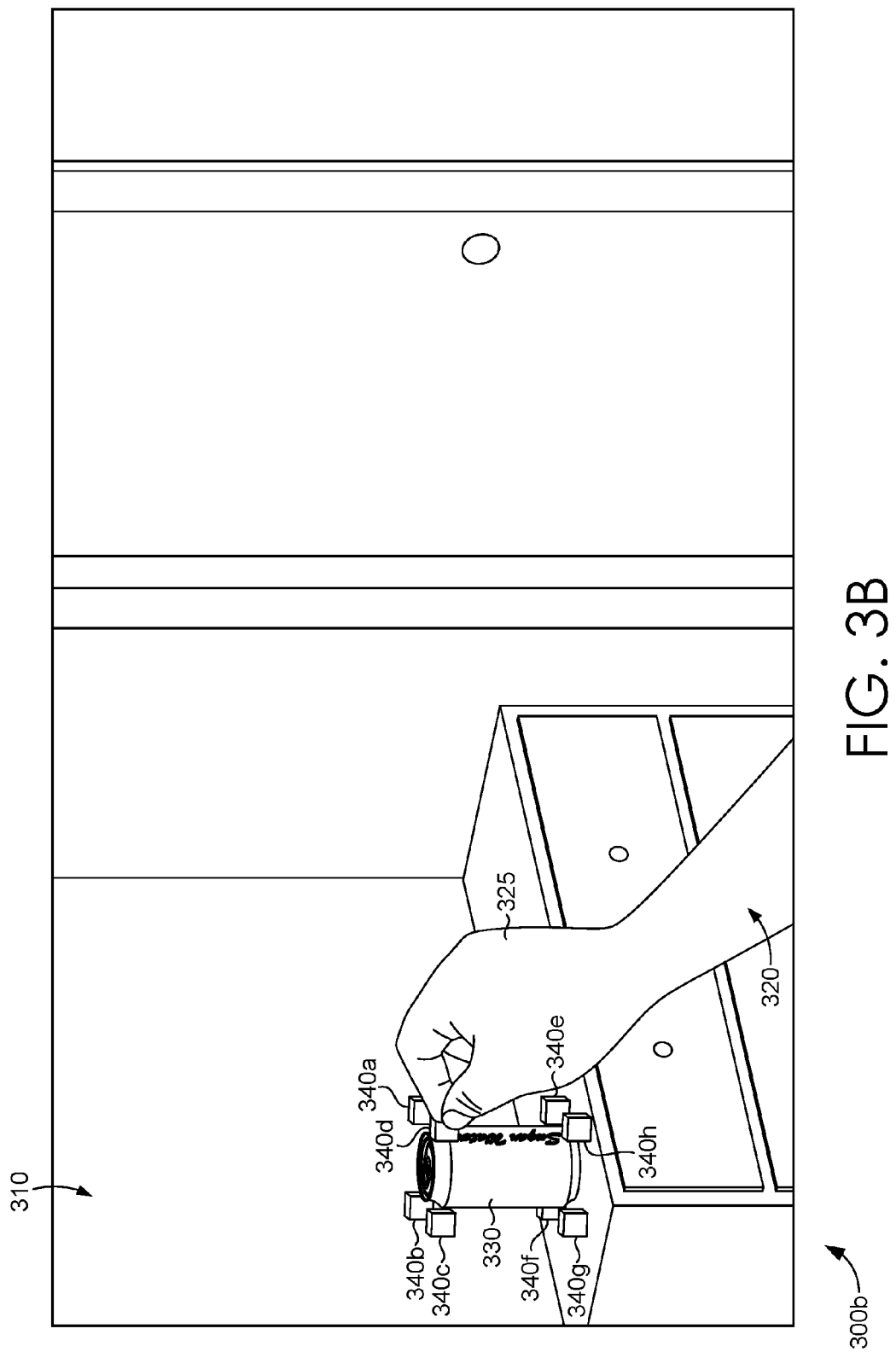

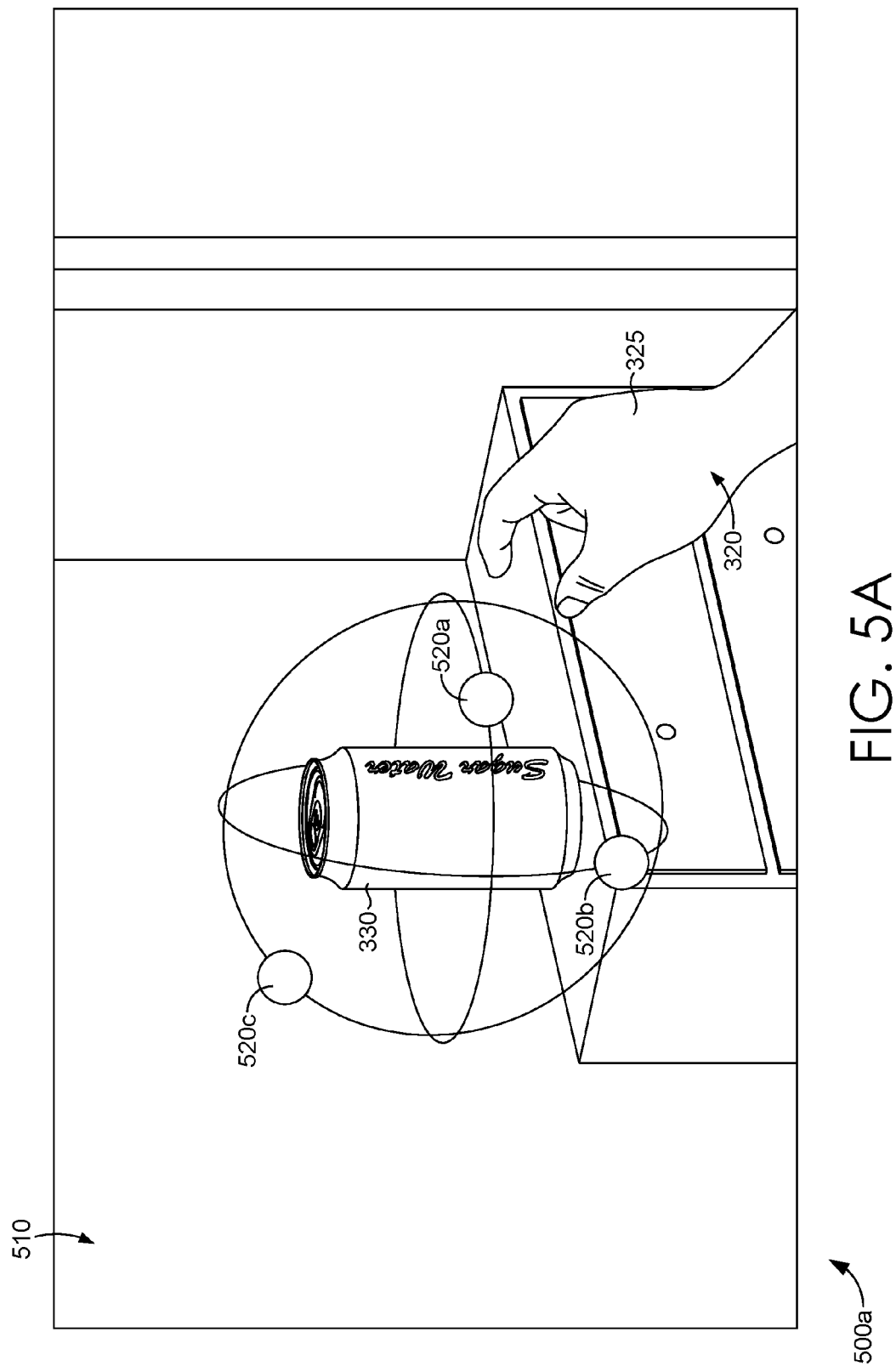

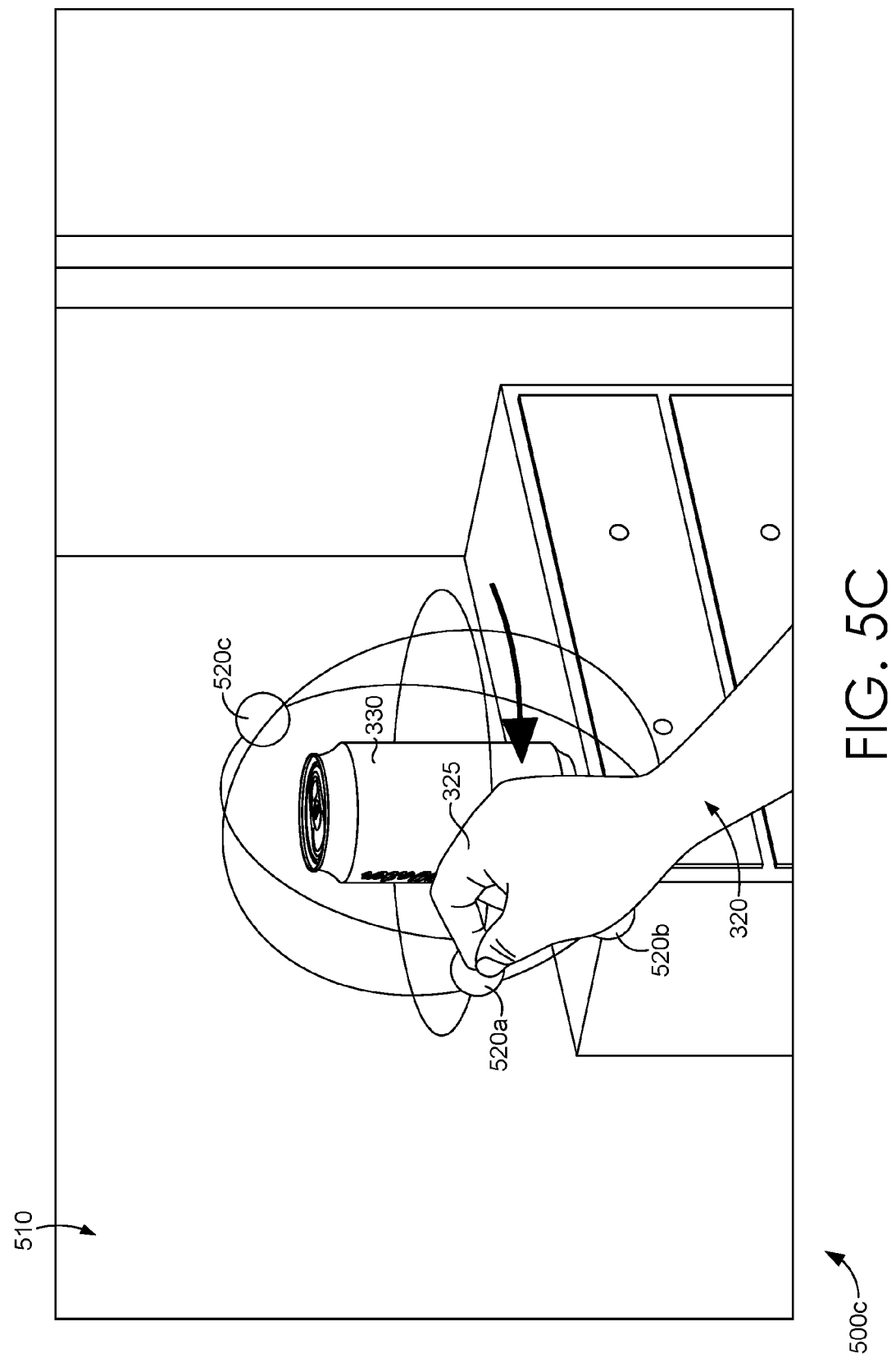

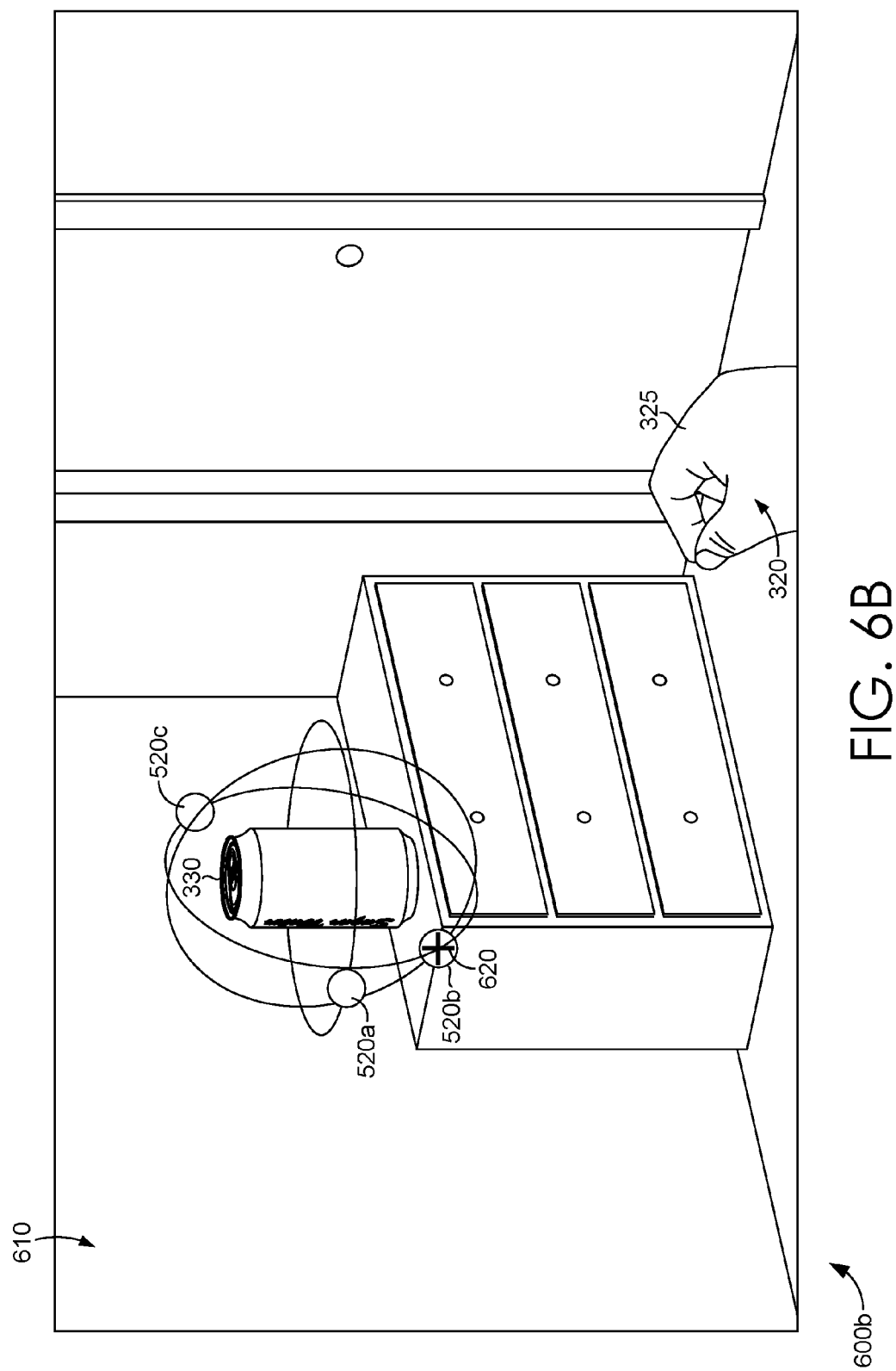

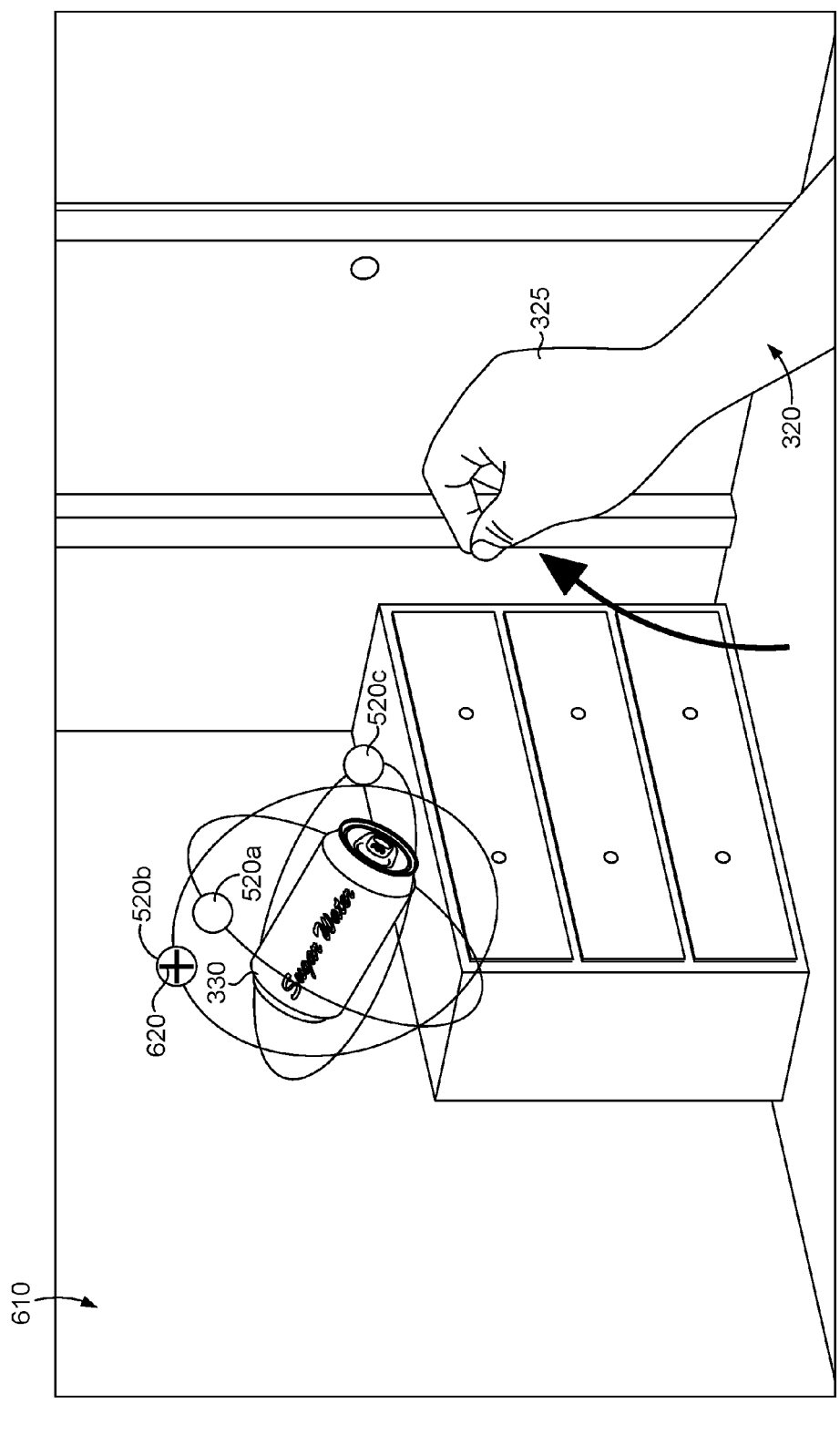

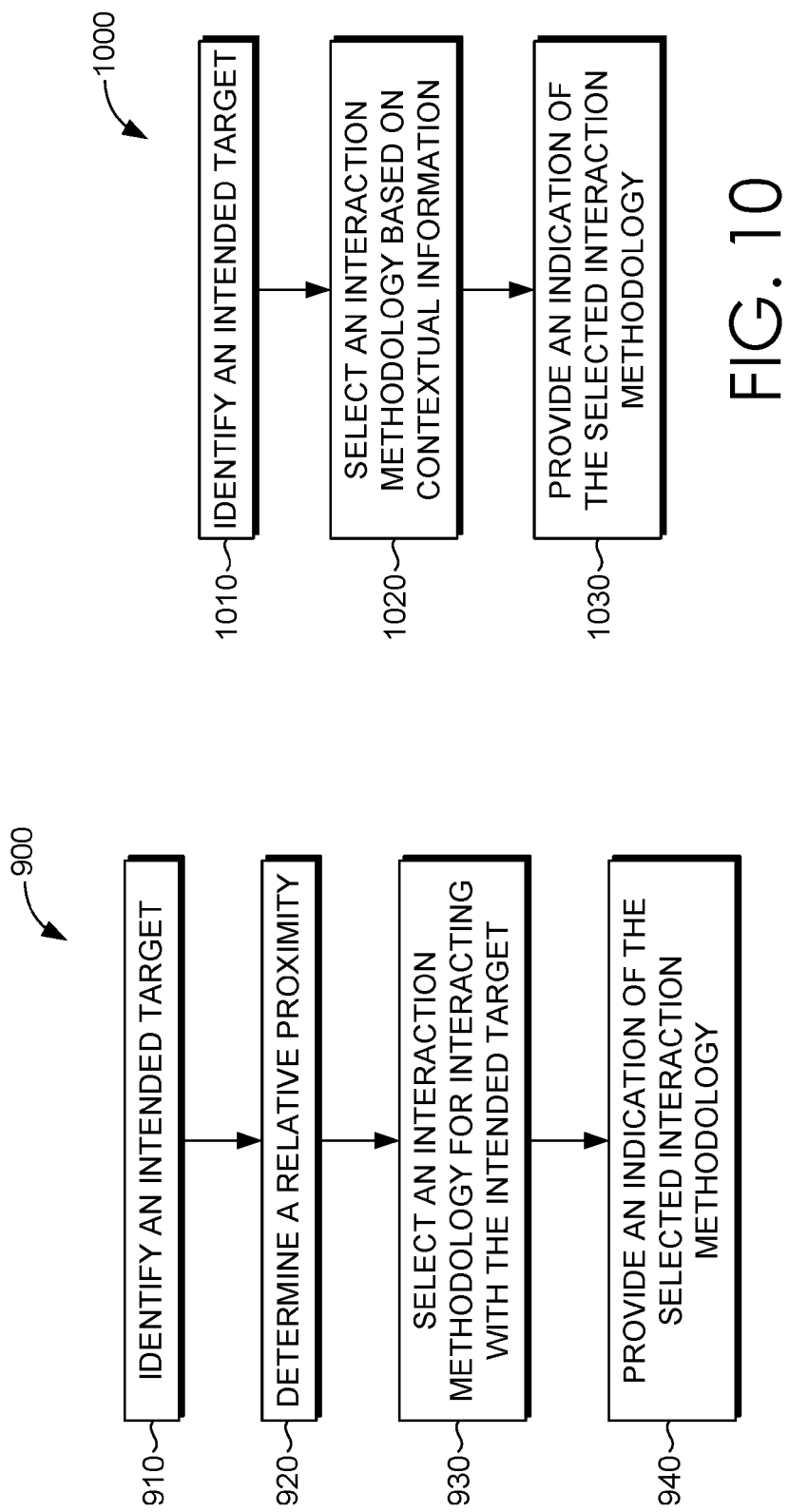

MEDIATION OF INTERACTION METHODOLOGIES IN IMMERSIVE ENVIRONMENTS

BACKGROUND

Immersive technologies, such as virtual, augmented, and mixed reality, enable users to view and perceive computer-generated three-dimensional objects, as if the objects were actually present within the users' perceived environments. Advancements in computing have fueled tremendous development efforts to apply these technologies to both entertainment and enterprise marketplaces. Realistic perception of computer-generated three-dimensional objects, which in some instances include holograms, was one of the greatest challenges in these development efforts. This challenge has been met with a variety of new innovations, such as the head-mounted display, position and orientation sensors, stereoscopic displays, eye-tracking sensors, and the like.

Providing a realistic interactive experience with computer-generated three-dimensional objects is another, yet very important aspect of immersive technology. While much advancement has been made in this area, it still remains a challenge. Various interaction methodologies, including the controller-based interaction methodology, the natural interaction methodology, and the hyper-natural interaction methodology, have each been developed to facilitate a user's virtual interactions with computer-generated three-dimensional objects. Each of these interaction methodologies work quite well for their intended purposes, but are more relevant to some situations over others. That is, one interaction methodology may be more intuitive and natural in a particular situation, and not so much in a different situation. In dynamic and constantly-changing immersive environments, it is important to provide users with the most natural and intuitive mode of interaction for any given situation.

SUMMARY

Embodiments described herein provide methods and systems for mediating between interaction methodologies in immersive environments. More specifically, an appropriate interaction methodology is selected for an intended target rendered within an immersive environment based on analyzed contextual information. In essence, an appropriate interaction methodology is dynamically selected for virtual interaction with a rendered object for any given scenario.

An intended target is identified from one or more virtual objects rendered in an immersive environment. An analysis of contextual information is conducted to determine a most appropriate interaction methodology for interacting with the intended target. The most appropriate interaction methodology is then selected for user interaction with the intended target. Once the appropriate interaction methodology for user interaction with the intended target is selected, an indication of the selected interaction methodology is provided. To this end, a most appropriate interaction methodology for any object rendered in an immersive environment can be dynamically selected to facilitate an intuitively interactive and immersive experience.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 3A-3C are schematics showing exemplary fields of view depicting an exemplary implementation of a natural interaction methodology, in accordance with some embodiments of the present disclosure;

FIGS. 5A-5C are schematics showing exemplary fields of view depicting another exemplary implementation of a natural interaction methodology, in accordance with some embodiments of the present disclosure;

FIGS. 6A-6C are schematics showing exemplary fields of view depicting another exemplary implementation of a hyper-natural interaction methodology, in accordance with some embodiments of the present disclosure;

FIG. 9 is a flow diagram showing a method for mediating interaction methodologies with virtual objects, in accordance with some embodiments of the present disclosure;

FIG. 10 is a flow diagram showing another method for mediating interaction methodologies with virtual objects, in accordance with some embodiments of the present disclosure;

DETAILED DESCRIPTION

Figure 1:
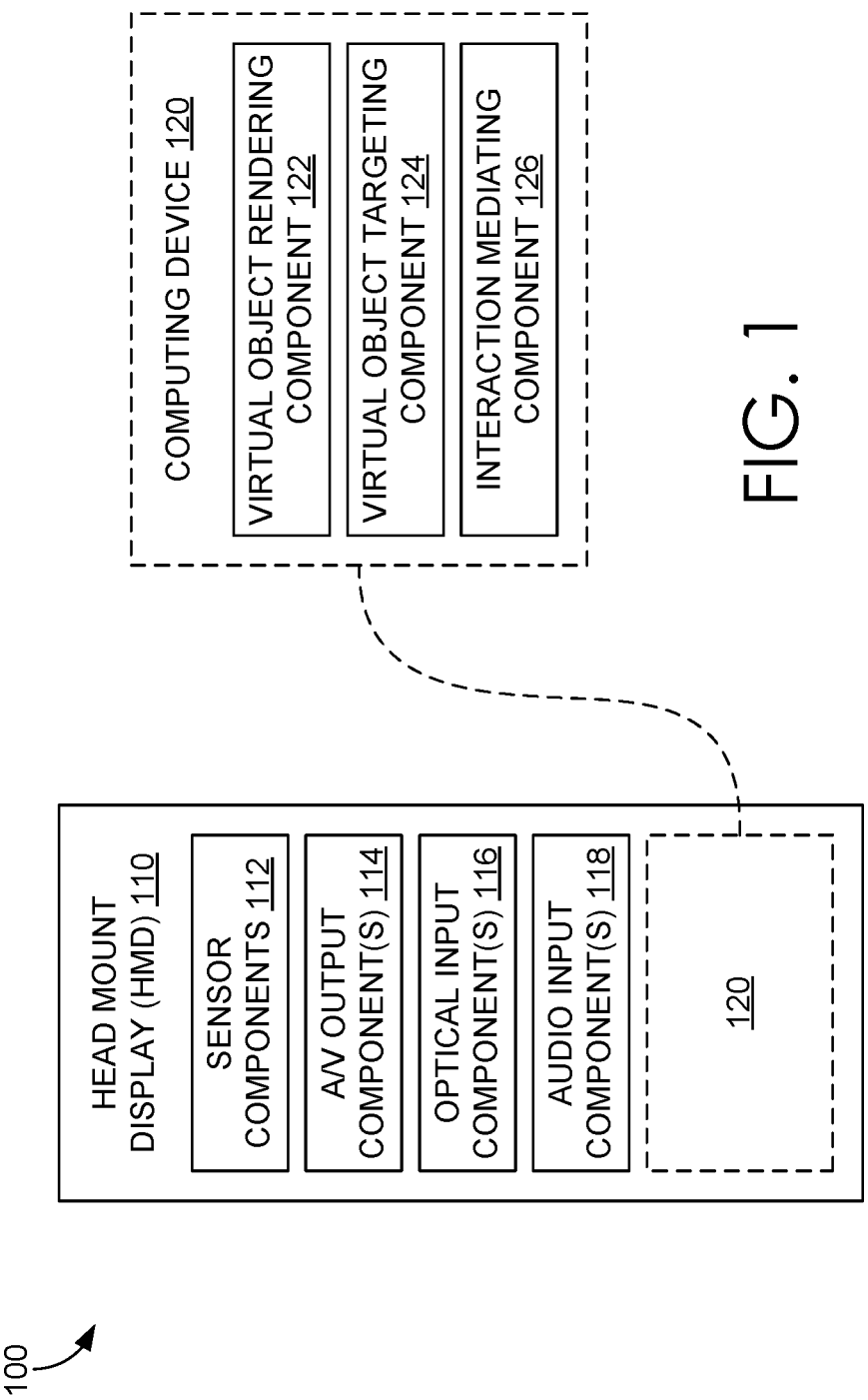
FIG. 1 is a block diagram of an exemplary head-mounted display unit, in accordance with some embodiments of the present disclosure.

Immersive technologies can enable the realistic perception of computer-generated three-dimensional ("3D") objects and, in some configurations, can enable perceived interactivity with these objects. There are three major design approaches that exist in 3D interaction research: naturalism (i.e., "natural"), magic, and hyper-natural. "Naturalism attempts to design interaction techniques to work exactly the way the real world works or at least as close as is practically possible. Magic techniques try to enhance usability and performance by giving the user new abilities and non-natural methods for performing tasks. Hyper-natural techniques are magic techniques that use natural movements but make them more powerful by giving the user new abilities or intelligent guidance. Increased interaction fidelity is what distinguishes hyper-natural techniques from standard magic techniques." R. P. McMahan, Kopper, R., and Bowman, D. A., "Principles for Designing Effective 3D Interaction Techniques", in Handbook of Virtual Environments: Design, Implementation, and Applications, 2nd ed., K. Hale and Stanney, K. Boca Raton, Fla.: CRC Press, 2015, pp. 285-311.

Each of these interaction methodologies or techniques has their advantages and disadvantages, however. A natural interaction with 3D objects has the advantage of being familiar to users because it corresponds to how we interact with objects in the real world. However, interacting with 3D objects out of arms reach can be difficult. At a distance, hyper-natural or magic interaction methodologies are generally better than the natural interaction methodology. Ray casting, by way of example, is a feature typically employed by various hypernatural interaction methodologies for interacting with distant objects. With ray casting, a virtual light ray of sorts, projected from a user's hand or head for example, can enable the user to interact with objects that are far away or out of arms reach. Interacting with objects using ray casting can be challenging, however. In other words, certain interaction methodologies are situationally more appropriate than others.

For purposes of the present disclosure, the hyper-natural and magic interaction methodologies will be grouped together and referenced as hyper-natural interaction methodologies. It is contemplated, however, that in some embodiments, the magic and hyper-natural interaction methodologies can be distinguished and considered as distinctive interaction methodologies, and any reference to a hyper-natural interaction methodology could be referencing any individual one, or both of, the magic and hyper-natural interaction methodologies.

Another well-known interaction methodology is one that is controller-based. That is, input devices (or "controllers") such as mice, keyboards, joysticks, virtual reality controllers, and the like, can be utilized to identify intended targets from rendered objects and interact with intended targets in an immersive environment. While controllers are typically utilized for gaming applications, they can be used in any type of immersive application for conducting basic to advanced interactions with rendered objects. The controller-based interaction methodology is not necessarily practical in every situation. By way of example, if a rendered object can easily be interacted with utilizing a natural interaction technique, a controller may be more restrictive in some aspects. In some other situations, like gaming, a controller may provide a more comfortable means for interacting with an object.

Embodiments of the present disclosure provide systems and methods for mediating between interaction methodologies best-suited for intended targets rendered in immersive environments. In other words, a user in an immersive environment can interact with rendered objects in the most intuitive manner based on analyzed contextual information. In some embodiments, the intended target can also be identified based on the analyzed contextual information.

Contextual information can include stored data, processed data, and/or obtained input data, as will be described herein. In accordance with embodiments described herein, input data can include sensor data, controller data, input device data, or any other obtained electronic data that can be processed and interpreted to determine a desired subject of interaction from one or more virtual objects rendered in an immersive environment. In other words, electronic data indicating a user selection from one or more rendered objects can be processed to identify the intended target. The intended target can be virtually rendered at any distance, angle, or orientation, or in other words provided for display in a manner that forces a user to perceive the intended target as being positioned at any distance, angle, or orientation, relative to the user.

Once identified, embodiments in accordance with the present disclosure can analyze various types of contextual information to determine the most appropriate interaction methodology for user interaction with the intended target. By way of a non-limiting example, one type of contextual information can include a user's relative proximity to the intended target. That is, a calculated distance between the user, or an extension of the user, and the intended target. In this way, a comparison of the relative distance can be made against a threshold distance, such as an average reach distance (e.g., 0.7 meters) of an arm, to determine whether the intended target is "near" (e.g., within reach) or "far" (e.g., out of reach) relative to the user. In various embodiments, contextual information can be derived from data or electronic information associated with the intended target, the immersive environment, other rendered objects, real world objects, sensor data, a user profile, an application state, or any combination thereof, to determine whether a particular interaction methodology is most appropriate for the intended target. The foregoing examples are merely exemplary and are not intended to be limiting in any way.

After the contextual information is analyzed, the most appropriate interaction methodology is determined and selected to provide the user with the determined best technique for interacting with the intended target. By way of example only, if the analyzed contextual information indicates that the intended target is near to the user, then a determination can be made that a natural interaction methodology is most appropriate for the intended target. In this regard, the user can employ any implemented natural interaction methodology (e.g., direct gesture interaction with object control points) to interact with the intended target. However, if the analyzed contextual information indicates that the intended target is far from the user, then a determination can be made that a hyper-natural interaction methodology is most appropriate for the intended target, and the user can employ any implemented hyper-natural interaction methodology (e.g., gaze cursor interaction with object control points plus gesture) to interact with the intended target. In another example, if the analyzed contextual information indicates that regardless of the relative distance of the intended target, the user has picked up or is interacting with a controller device, then a determination can be made that a controller-based interaction methodology is most appropriate for the intended target. In this way, the user can always use a controller device when desired, and the controller can override any other interaction methodology for user interaction with the intended target.

In accordance with embodiments described herein, an immersive environment can include any one of a virtual reality ("VR") environment, an augmented reality ("AR") environment, and a mixed-reality ("MR") environment, each of which are at least partially-rendered by one or more computing devices and provided for immersive display to a user. The term "environment" can reference a portion of or an entire collection of rendered objects available for perceivable display to the user. For instance, in a fully-virtual environment (e.g., VR), the environment can reference one or more sets of rendered objects, a rendered background or particle system, or any portion and/or combination thereof. In a partially-virtual environment (e.g., AR or MR), the environment can reference one or more sets of rendered objects, a particle system, a real-world space or backdrop, or any portion and/or combination thereof.

With reference now to FIG. 1, a block diagram 100 of an exemplary head-mounted display ("HMD") unit is provided, in accordance with some embodiments of the present invention. HMD 110 can include several components (e.g., sensor component(s) 112, A/V output component(s) 114, an optical input component 116, an audio input component, 118, and/or a computing component or computing device 120). A component as used herein refers to any device, process, or service, or combination thereof. A component may be implemented using hardware, software, firmware, a special-purpose device, or any combination thereof. A component may be integrated into a single device or it may be distributed over multiple devices. The various aspects of a component may be co-located or distributed. The component may be formed from other components and aspects thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In various embodiments, the sensor component(s) 112, A/V output component(s) 114, optical input component(s) 116, and/or audio input component(s) 118 can be integrated into the HMD 110, integrated into the computing device 120, or at least integrated in part with each the HMD 110 and computing device 120. Similarly, the computing device 120 can be integrated within the HMD 110, coupled to the HMD 110, or inserted into the HMD 110.

In some configurations, the HMD 110 can employ sensor component(s) 112, among other things, to identify an intended target from a rendered portion of an immersive environment, determine a position and/or orientation of the HMD 110, track physical movements (e.g., eye tracking, body tracking) of a user (not shown) wearing the HMD 110, and in some embodiments, track biofeedback (e.g., brainwaves) of the user wearing the HMD 110. In various configurations, the sensor component(s) 112 can facilitate the determination of a gaze position of the user.

In some further configurations, the HMD 110 can employ A/V output component(s) 114 to display or project a rendering of an at least partially-virtual environment for observation by the user. Similarly, the HMD 110 can employ optical input component(s) 116 to receive optical or motion data for environmental analysis and gesture detection, and/or audio input component(s) 118 to receive audio data for environmental analysis and voice command detection.

As will be described in more detail below, the computing device 120 can include, among other things, a virtual object rendering component 122, a virtual object targeting component 124, and/or an interaction mediating component 126. In accordance with embodiments described herein, it is contemplated that the aforementioned components can be implemented in any one or more components or subcomponents of computing device 120. For instance, any one of the components 122, 124, 126 may be implemented at least in part within a graphical processing unit (GPU), application code, firmware, and the like.

In accordance with embodiments described herein, the sensor component(s) 112 can include orientation sensor component(s) (e.g., gyroscope, accelerometer, and magnetometer) and/or positional sensor component(s) (e.g., infrared lights, infrared cameras, motion sensors, light sensors, 3D scanners, CMOS sensors, GPS radio, etc.) that can facilitate the generation of tracking data corresponding to the orientation and position of the HMD 110, also corresponding to the field of view perceived by the user of the HMD 110.

The generated tracking data can be communicated to the virtual object rendering component 122, which can analyze the tracking data to modify how virtualized objects are rendered and ultimately perceived by a user wearing the HMD 110. In other words, any one or more virtual objects rendered in an immersive environment, generated by the virtual object rendering component 122, can be transformed by the virtual object rendering component 122 to modify the position, size, shape, or angle, of the rendered virtual object(s) in accordance with the position and orientation of the HMD 110. Each virtual object rendered by the virtual object rendering component 122 is positioned at a corresponding location relative to the HMD, and thereby also to the user wearing the HMD. Moreover, the rendered virtual object(s) can be continuously modified in real-time, by the virtual object rendering component 122, to maintain the proper perspective and configuration of rendered virtual objects in accordance with the changing position and orientation of the HMD 110. In this regard, if a user moves closer to a rendered virtual object, its relative distance will appear closer to the user. Similarly, if the user moves away from the rendered virtual object, its relative distance will appear further from the user.

In accordance with embodiments described herein, the virtual object rendering component 122 can process received input data to transform an intended target identified from the rendered virtual objects. That is, various applications (e.g., immersive technology software) may include instructions or code that facilitate user interaction with one or more rendered virtual objects, facilitated by one of a plurality of interaction methodologies. When an intended target is identified, a user may be able to move (e.g., reposition), transform (e.g., scale, rotate, skew, stretch, warp, etc.), or delete rendered objects, or even create new ones, utilizing a selected interaction methodology. As was described herein above, interaction methodologies can include the natural or direct interaction methodology, the hyper-natural interaction methodology, or the controller-based interaction methodology, among others, which can each facilitate user interaction.

The virtual object targeting component 124 can determine, based on received user inputs, an intended target from one or more virtual objects rendered in the immersive environment. That is, based on input data obtained by the HMD, the virtual object targeting component 124 can identify an intended target from a plurality of rendered virtual objects in an immersive environment.

In accordance with embodiments described herein, the input data obtained by the HMD can include any piece of electronic information obtained by sensor components 112, optical input components 116, audio input components 118, any combination thereof, or any other component operable to communicate sensed electronic information to the HMD for analysis. In one example, optical input components 116 can detect a user's hand position relative to a perceivable rendering position of a virtual object to sense an intended target. In another example, an eye-tracking sensor can be utilized to detect a user's gaze directed to a particular rendered virtual object to sense the intended target. In another example, sensor components 112 can comprise invasive or non-invasive brain computer interfaces. Non-invasive techniques, such as electroencephalography (EEG), can be utilized to sense intended targets from a user. Invasive techniques, such as electrocorticography (ECoG), or electrodes planted directly into the brain (primarily used to help people with vision or motor impairments), can also be utilized to sense intended targets from the user.

In some embodiments, the intended target can be identified simply based on its relative proximity to the HMD or user. For instance, if a first virtual object is rendered within the HMD user's observable field of view, then it can be identified as the intended target. If the user traverses the environment, leaving the first virtual object out of the observable field of view so that a second virtual object is rendered within the observable field of view, then the second virtual object can be identified as the intended target.

In some further embodiments, the intended target can be identified by the virtual object targeting component 124 as one of a set of virtual objects rendered within the reach of the user or an extension thereof. That is, a set of virtual objects can be rendered within a reach distance of the user, such that each of the virtual objects can be directly or naturally interacted with. In this way, any one of the set of virtual objects can be virtually touched and thereby identified as the intended target. By way of example, if a set of virtual soda cans was rendered within 0.7 meters from the user's position, the user could simply reach out to interact with a particular virtual soda can and, by way of virtually touching the particular virtual soda can, can cause the virtual object targeting component 124 to identify it as the intended target. In accordance with embodiments described herein, natural interactions can be facilitated via recognized gestures performed by the user. The user can perform gestures using their extremities (e.g., arms, fingers, legs, toes, etc.), which can be detected via an optical input component 116 such as a camera, motion sensor, IR sensor, and the like.

In some further embodiments, the intended target can be identified by the virtual object targeting component 124 based on a determined approximate user hand distance to one virtual object from the set of virtual objects. In other words, an approximation of a virtual object's proximity to the user's hand can be made utilizing input data received by sensor components 112 and/or optical input components 116, among other things. In some configurations, a simple distance comparison between each virtual object's position against an approximate or predefined length of the user's arm (e.g., 0.7 meters) extended toward the direction indicated by the received input data can enable an identification of an intended target. In this regard, if two virtual objects were placed adjacent to one another on the same plane, and located at relatively equal distances away from the user, the virtual object determined as being closest to the user's hand can be identified as the intended target.

In some further embodiments, more intricate details associated with the user's hand can be analyzed to facilitate the identification of the intended target. More specifically, an orientation of the hand, finger positioning and joint angles, gestures (e.g., pointing), or other hand characteristics that are detectable based on an analysis of the received input data can enable the virtual object targeting component 124 to identify an intended target from a set of rendered virtual objects.

In some further embodiments, the intended target can be identified by the virtual object targeting component 124 as one of a set of virtual objects rendered beyond the reach of the user or an extension thereof. That is, a set of virtual objects can be rendered beyond a reach distance of the user, such that each of the virtual objects cannot be directly or naturally interacted with. In this way, any one of the set of virtual objects can be hyper-naturally interacted with and thereby identified as the intended target. By way of example, if a set of virtual soda cans was rendered beyond 0.7 meters from the user's position, the user would not be able to reach out to interact with a particular virtual soda can. As such, an aspect of hyper-natural interaction methodology can be utilized to interact with the cans. In this regard, the user can employ various hyper-natural interaction techniques (e.g., adjusting gaze position) to select a particular virtual soda can, and cause the virtual object targeting component 124 to identify it as the intended target.

In some further embodiments, the intended target can be identified by the virtual object targeting component 124 as one of a set of virtual objects rendered both within and beyond the reach of the user or an extension thereof. That is, a set of virtual objects can be rendered either near or far from the user, so that some of the virtual objects can be directly interacted with, while others cannot. In such circumstances, it is contemplated that various methods for selecting the intended target from the set can be implemented. For instance, aspects of hyper-natural interaction techniques, such as detecting a user's gaze position, can be employed to identify a rendered virtual object positioned either within or beyond the user's reach.

In some further embodiments, the virtual object targeting component 124 can employ audio input component(s) 114 to detect recognizable voice commands, recognizable object names, or other recognizable audible inputs to facilitate the identification of the intended target. By way of example, instead of gaze position, the virtual object targeting component 124 can be configured to receive a user input via audio input component(s) 114, in the form of audio, to identify an intended target based on the user input. In some embodiments, the virtual object targeting component 124 can receive audio inputs (e.g., voice input), or instructions based on received audio inputs, to determine that a keyword, phrase, or object name corresponding to a particular virtual object rendered in the immersive environment is received. In this way, when the keyword, phrase, or name corresponding to the particular virtual object is detected (e.g., spoken by the user), the particular virtual object can be identified as the intended target. It is contemplated then, that subsequent user inputs (e.g., gestures) can facilitate interaction with the intended target (for instance, via virtual object rendering component 122).

In accordance with embodiments described herein, it is contemplated that any one of the described embodiments, or a combination thereof, can be employed by the virtual object targeting component 124 to identify an intended target from one or more virtual objects rendered in the immersive environment. It is also contemplated that any other undisclosed embodiment for selecting a particular rendered virtual object can be employed, alone or in combination with the described embodiments, to facilitate identification of the intended target by the virtual object targeting component 124.

After the intended target is identified by the virtual object targeting component 124, the interaction mediating component 126 can select, based on an analysis of contextual information obtained by the HMD or obtained by components in communication with the HMD, a most appropriate interaction methodology for interaction with the intended target. In accordance with embodiments described herein, each situation can be dynamically analyzed utilizing one or more pieces of contextual information, where each piece of contextual information independently or in combination with other pieces of contextual information, can influence a determination and selection of the most appropriate interaction methodology for the intended target. In accordance with embodiments described herein, contextual information can include characteristics of the intended target, characteristics of a detected interaction, an application state, a user interaction history, a user profile, and a multi-user interaction state, just to name a few.

In some circumstances, a natural interaction methodology with an intended target is generally preferred over a hyper-natural interaction methodology, such that the most natural and realistic experience is provided to the user. In this regard, a standard baseline determination between selections of a natural vs. hyper-natural interaction methodology can be based on characteristics of the intended target. For example, a distance of an intended target relative to the user (or HMD) can be used to determine whether a natural or hyper-natural interaction methodology is most appropriate for interaction with the intended target. A determination can be made to determine if the intended target is within a threshold distance (e.g., D1) relative to the user. That is, when an intended target is determined to be equal to or less than the threshold distance (for instance, the average reach distance or actual arm length of the user), a natural interaction methodology can be selected for interaction with the intended target. If, however, the intended target is determined to be greater than the threshold distance, a hyper-natural interaction methodology is selected for interaction with the intended target. As was described herein, the distance of a virtual object can be determined by its rendered position, which can be based at least in part on positional coordinates (particularly the depth value) of the virtual object's transformation matrix, among other things.

It is further contemplated that the interaction mediating component 126 may give more weight, or in some instances full weight, to particular pieces of contextual information. For instance, some pieces of contextual information can affect the threshold distance at which the interaction mediating component 126 can compare against an intended target's relative distance to the user. In this regard, if a piece of contextual information causes an increase in the threshold distance at which the interaction mediating component 126 compares against an intended target's relative distance to the user, it would be more difficult for the user to directly interact with the intended target. Instead, the user may have to lean in more, or walk closer to the intended target to directly interact with it. Various factors, such as a user profile, user preferences, or an application state, among other things, may change the threshold distance, thereby adjusting the interaction mediating component's 126 selection sensitivity.

By way of example, if multi-user interaction is enabled, where more than one user can virtually interact with the same object, the threshold distance can be extended so a user cannot interact with the intended target as easily as they normally could (e.g., they would have to reach a little further than usual). In another example, if the user profile defined the user's arm length, or defined the threshold distance, this defined distance could directly translate into the predefined threshold distance. In another example, if the user interacted with intended targets differently at one location (e.g., at work) versus another location (e.g., at home), then this contextual information (e.g., GPS location) can be considered to adjust the threshold distance accordingly. In another example, detected adjustments to the user's hands (e.g., outstretched fingers) can also be considered to adjust the threshold distance. In another example, a user history indicating how the user has interacted with various intended targets in various contextual situations can be considered to adjust the threshold distance as well.

For instance, some pieces of contextual information can override other pieces of contextual information, such that a certain interaction methodology is selected for an intended target based on the overriding pieces of contextual information. While in some circumstances the natural interaction methodology can generally be preferred over the hyper-natural interaction methodology, in some implementations, a controller-based interaction methodology can be preferred over both the natural and hyper-natural interaction methodologies. By way of example only, if there is a clear intention to use a controller to interact with the intended object (e.g., a detected push of a controller button or detected touch of the controller, or a detected change in controller orientation or position, etc.), this piece of contextual information can indicate a user-controller interaction and thereby immediately override other pieces of contextual information, so that the controller-based interaction methodology is selected by the interaction mediating component 126.

In another instance, certain states of an application (e.g., the immersive technology software) may limit interaction methodologies available to the user. In this regard, the application state can be one piece of contextual information that overrides other pieces of contextual information, such that the interaction mediating component 126 selects a particular interaction methodology for an intended object based on the application state. By way of example, if the application requires a controller-interaction methodology be selected during a particular portion of the application (e.g., an introduction scene), then the application state (i.e., requiring the controller-interaction methodology) can dictate the selection of the controller-interaction methodology. The same can be said regarding any known interaction methodology, in accordance with embodiments described herein.

When an interaction methodology is selected, various forms of user inputs can be received (e.g., via sensors, input devices, etc.), and how those user inputs are interpreted can depend on which interaction methodology is selected. In this way, in some implementations, only one selected interaction methodology for interacting with virtual objects can be utilized at a time. By way of example, if a controller-based interaction methodology is selected, then user inputs received via a joystick, mouse, keyboard, IR controller, VR controller, or other user input device can enable user interaction with an intended target. Meanwhile, other user inputs (e.g., gestures) detected or sensed by other input components 112, 116, 118 that are typically recognized via other interaction methodologies for interaction can be ignored.

With reference to FIGS. 2A-6C, embodiments of the present disclosure can be explained in more detail, using examples. For purposes of explanation, interaction with an intended target is described in the examples as a user modification, particularly a resizing or rotating, of the intended target. In various implementations, a rendered virtual object may include one or more control points that facilitate a natural or hyper-natural interaction therewith. As will be described in more detail with regard to FIGS. 3A-3C and 5A-5C, a virtual object can be rendered having control points that facilitate a natural interaction with the virtual object. In this way, a user can directly interact with a virtual object control point to interact with the virtual object. In some further implementations, a selected control point of the intended target can be directly interacted with to facilitate directed interactions or modifications to the intended target based on the selected control point. For the natural interaction methodology, the virtual object targeting component 124 can employ the optical input component(s) 116, among other things, to detect a recognized gesture (e.g., a pinch and adjust) performed directly on a control point.

For the hyper-natural interaction methodology, various user inputs typically associated with hyper-natural interactions can enable interactions with some virtual objects. As was described above, and will be described in more detail with regard to FIGS. 4A-4D and 6A-6C, a virtual object can be rendered having control points that facilitate interaction therewith. In some embodiments, the virtual object targeting component 124 can identify an intended target based on a detected gaze position of the user. By way of example, a gaze position can be determined by obtaining a field of view center value that is based on received sensor component data (e.g., via sensor component(s) 112, including at least one of position sensors, orientation sensors, eye movement trackers, and the like). In some implementations, a gaze position indicator (e.g., crosshairs) can be provided for display to the user when the hyper-natural interaction methodology is selected. If the determined gaze position corresponds to a portion of a rendered virtual object, it can be identified as the intended target, in accordance with some embodiments. In some further implementations, the gaze indicator can be utilized to select a particular control point of an intended target to perform directed interactions or modifications to the intended target based on the selected control point.

Figure 2A:
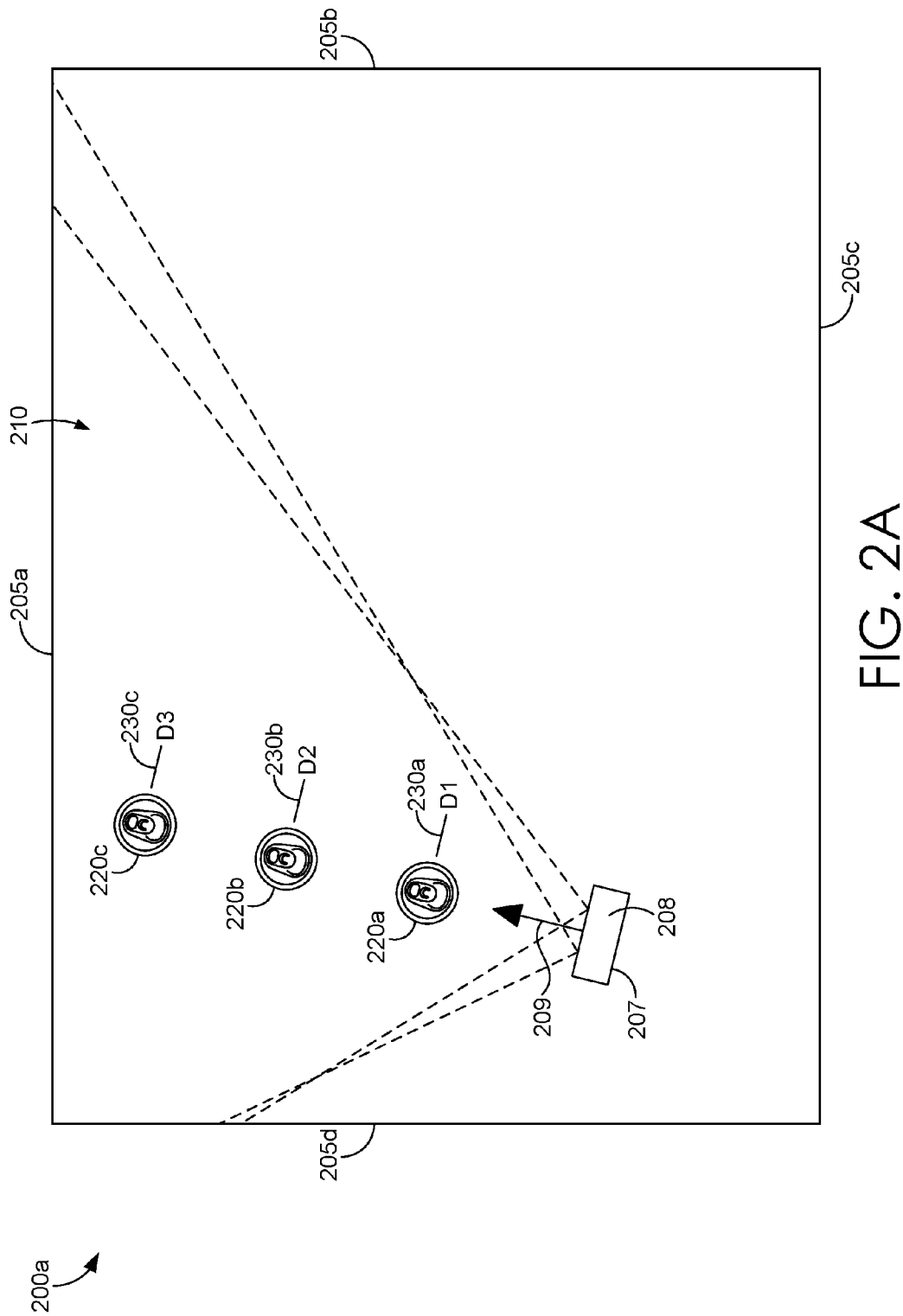
FIG. 2A is a schematic showing an exemplary virtual reality device environment, in accordance with some embodiments of the present disclosure.

Looking now at FIG. 2A, an exemplary operating environment 200 having a room surrounded by walls 205a-205d, is shown along with an HMD 208 in operation by a user 107 located therein. The HMD 208, or components coupled thereto, can present an immersive, or in other words, an at least partially-virtual environment for display to and perception by the user 207. Here, the user 207 wearing HMD 208 is oriented in a direction indicated by the arrow 209, such that the perceivable field of view 210 of the at least partially-virtual environment includes a portion of the left and front walls 205a, 205d. While the illustrations herein depict a mixed-reality environment, it is contemplated that any immersive environment (e.g., VR, AR, or MR) can also fall within the purview of the present disclosure. Rendered by the HMD (and/or the components coupled thereto) and perceivable by the user 207 are three virtual soda cans 220a-220c that are each positioned at different distances D1 230a, D2 230b, and D3 230c, relative to the position of the user. For purposes of these examples, it is assumed that distances D1 230a, D2 230b, and D3 230c are each measured relative to a position of the HMD 208. D1 230a is assumed to be about an arm's reach length (e.g., 0.7 meters) away. D2 230b is assumed to be about twice the distance of D1 230a (e.g., 1.4 meters), while D3 230c is assumed to be about three times the distance of D1 230a (e.g., 2.1 meters).

Figure 2B:
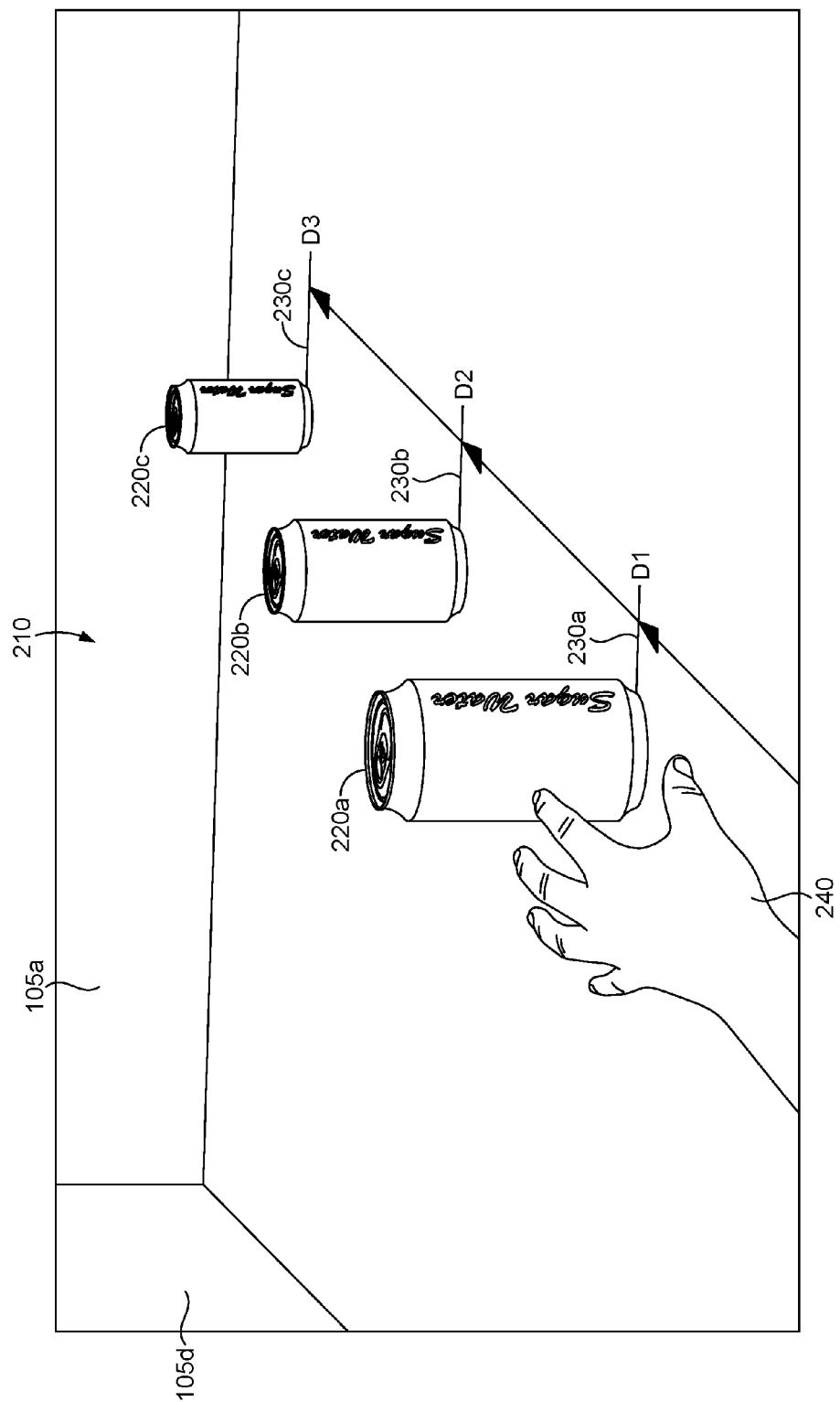
FIG. 2B is a schematic showing an exemplary field of view perceived via an exemplary head-mounted display, in accordance with some embodiments of the present disclosure.

With reference now to FIG. 2B, the graphical illustration 200b depicts a field of view 210 perceived by the user 207 wearing HMD 208, as configured in FIG. 2A, and in accordance with some implementations of the present disclosure. Illustrated as being perceived within the field of view 210 is the user's real-world environment (e.g., the walls 205a, 205d and floor) and three virtual objects portrayed as soda cans 220a-220c, where each of the cans 220a-220c are rendered via the HMD 208 to augment the user's observable field of view 210. While the illustration here is depicted with augmented or mixed-reality, it is contemplated that virtual reality is also within the purview of the present disclosure.

As described above, each soda can 220a-220c is positioned at different distances D1 230a, D2 230b, and D3 230c, relative to the position of the user. Also as described above, the distance D1 230a is assumed to be about an arm's reach length (e.g., 0.7 meters) away. The user's left arm 240 is depicted as being partially extended and having at least enough reach to naturally interact with the nearest positioned soda can 220a. In this regard, it is contemplated that a natural interaction methodology for interacting with the first soda can 220a would be most appropriate. The other soda cans 220b, 220c are perceived as being positioned beyond the user's reach, and so it is contemplated that a natural interaction methodology with the soda cans 220b, 220c would not be appropriate. Instead, a hyper-natural interaction methodology to interact with the more distant soda cans 220b, 220c may provide a better interactive experience for the user.

In embodiments, the virtual object targeting component 124 of FIG. 1 can be configured to identify an intended target from one or more rendered virtual objects, such as soda cans 220a-220c. As described above, in some embodiments, the intended target can be the rendered virtual object that is within the reach distance (D1) 130a of the user, such as soda can 220a. In some further embodiments, the intended target can be the rendered virtual object that is determined to be positioned nearest the hand 240 of the user, which here again would be soda can 220a. It is contemplated that the vector direction of the user's arm having a predefined or approximate length of the user's arm can be processed to calculate a relative reach distance of the user's hand. This calculated relative reach distance can be compared to the rendered position of each of the rendered virtual objects to determine which object is most proximate to the user's hand. In this way, the closest rendered virtual object can be identified as the intended target. In some further embodiments, the intended target can be the rendered virtual object that is determined to intersect with a gaze position. As will be described in more detail with regard to FIGS. 4A-4D and 6A-6C, the gaze position can be adjustably positioned by the user to intersect with a particular rendered virtual object to thereby selectively identify the intended target. In even further embodiments, the intended target can be the rendered virtual object that is determined to intersect with a gaze position while a recognizable gesture is detected by one or more components of the HMD, such as the virtual object targeting component 124 of FIG. 1.

Figure 3A:
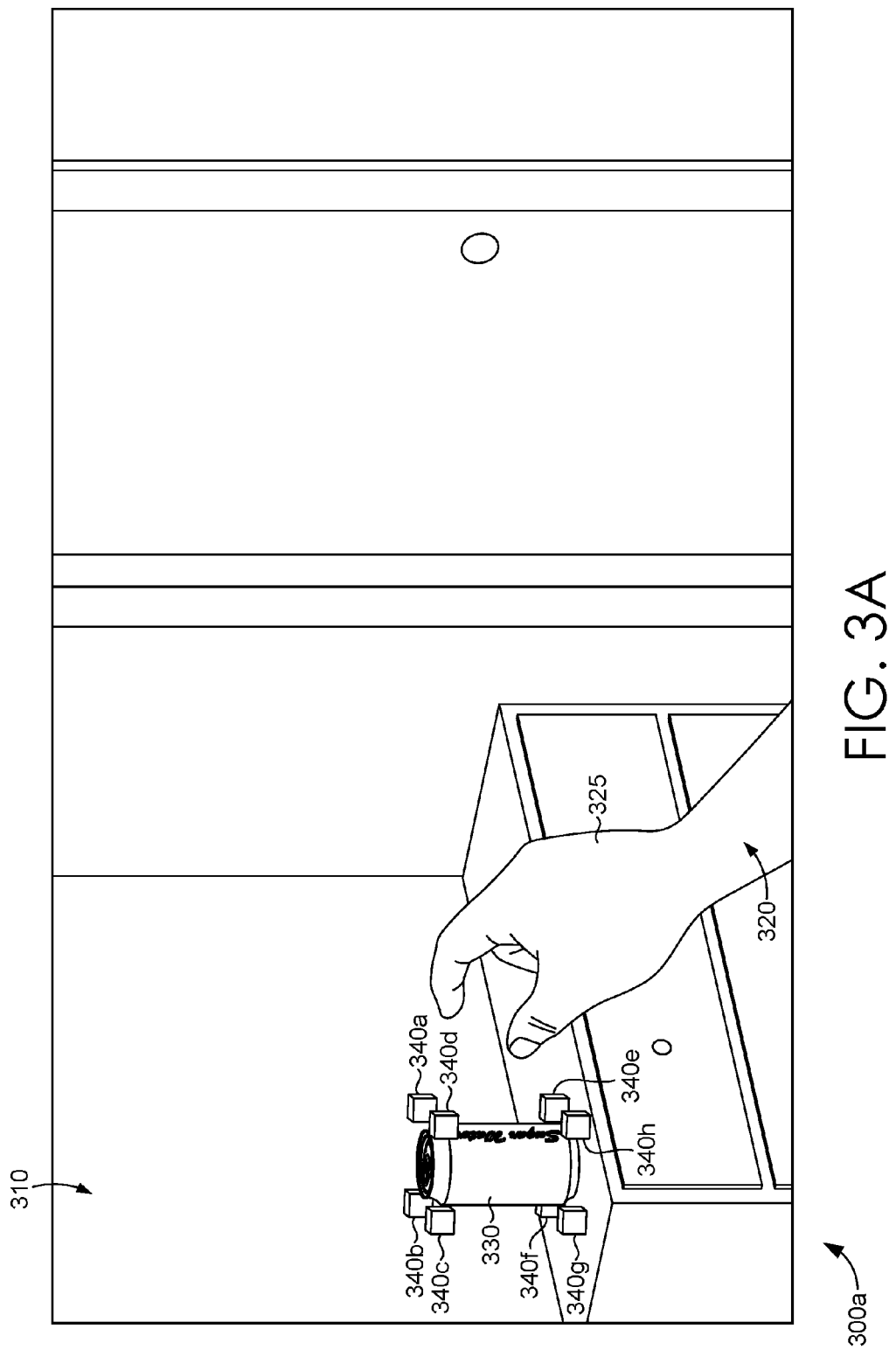

Looking now to FIG. 3A, a graphical illustration 300a showing a field of view 310 perceived by the user 320 wearing an HMD (not shown) in accordance with some implementations of the present disclosure is depicted. Within the field of view 310 is a rendered virtual object representing a soda can 330 having eight control points 340a-340h configured thereon. The soda can 330 is positioned (i.e., rendered) for perception within reach of the user's right hand 325 and, as such, a natural interaction methodology would be most appropriate for the given situation. Here, and in accordance with embodiments described herein, the soda can 330 is the only virtual object rendered in the perceived field of view 310 and can be identified as the intended target, for instance by virtual object targeting component 124 of FIG. 1. Moreover, because the soda can 330 is rendered at a relative distance that is within a predefined threshold distance (e.g., less than the user's arm length), the interaction mediating component 126 of FIG. 1 can select the most appropriate interaction methodology for interacting with the soda can 330, here being the natural interaction methodology.

Looking now to FIG. 3B, another graphical illustration 300b showing the field of view 310 perceived by the user 320 wearing an HMD (not shown) in accordance with some implementations of the present disclosure is depicted. Here, the user 320 has reached out his right hand 325 to directly interact with a control point 340d of the soda can 330. More specifically, the user has made a pinch gesture with his right hand 325, whereby his fingers pinch the closest control point 340d of the soda to effectuate a modification (e.g., a stretch) of the soda can 330.

Figure 3C:
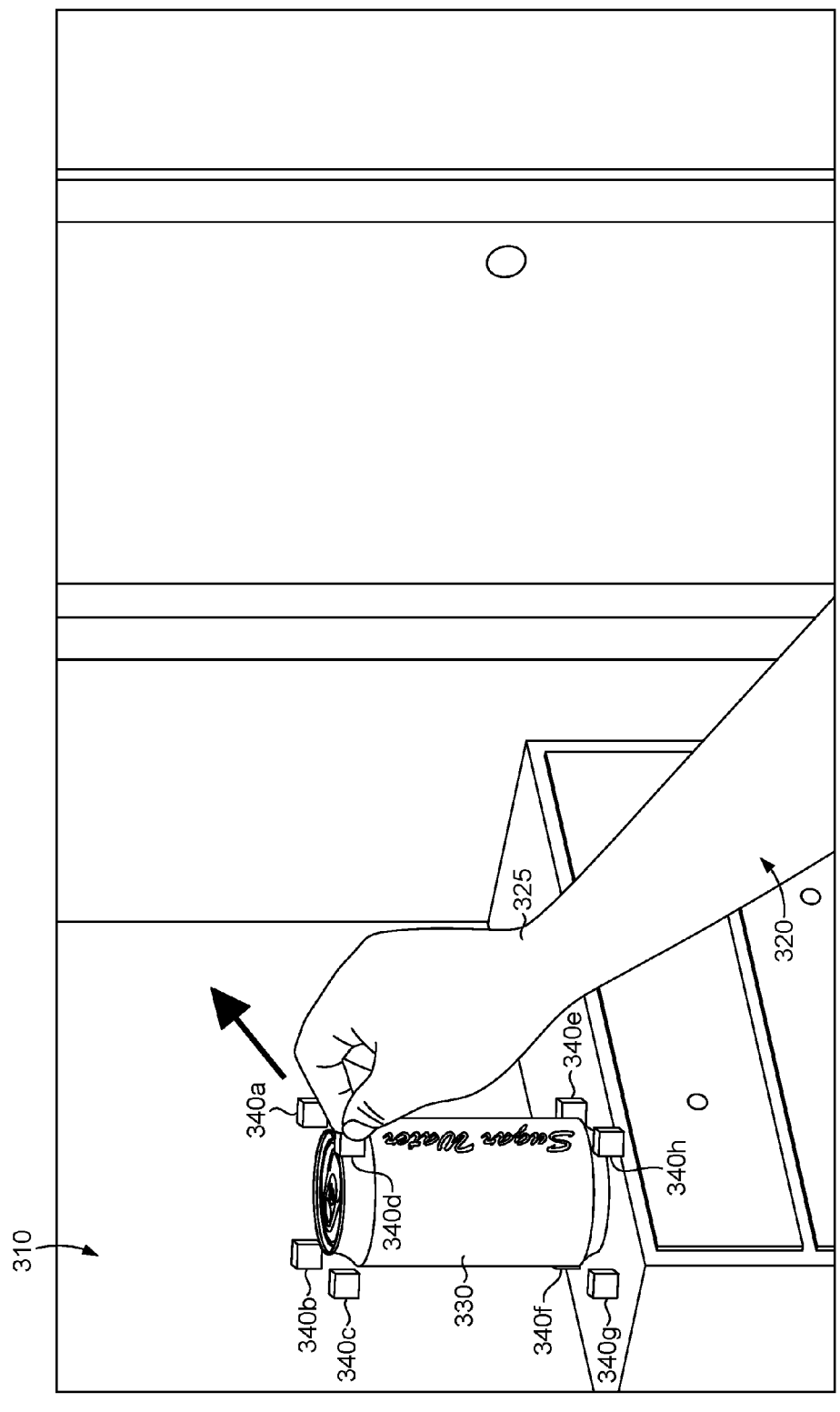

Looking now to FIG. 3C, another graphical illustration 300c showing the field of view 310 perceived by the user 320 wearing an HMD (not shown) in accordance with some implementations of the present disclosure is depicted. Here, the user 320 has performed a stretching gesture (e.g., a pinch and pull) corresponding to the control point 340d associated with the soda can 330. As a result, this natural interaction has caused a modification to the soda can 330, particularly an enlargement thereof.

Figure 4A:
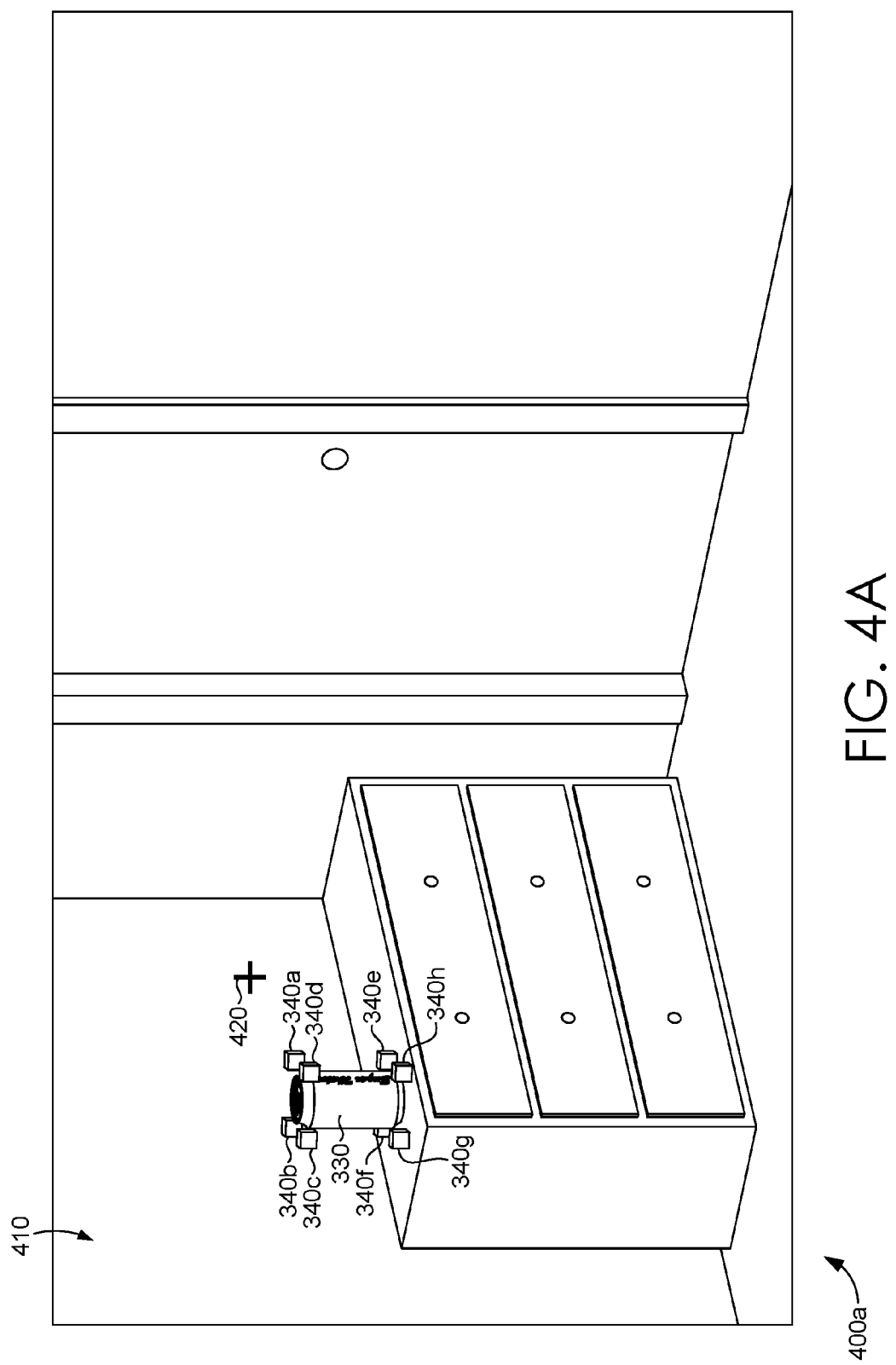
FIGS. 4A-4D are schematics showing exemplary fields of view depicting an exemplary implementation of a hyper-natural interaction methodology, in accordance with some embodiments of the present disclosure.

With reference now to FIG. 4A, a graphical illustration 400a showing a field of view 410 perceived by the user 320 wearing an HMD (not shown) in accordance with some implementations of the present disclosure is depicted. Following the examples depicted in FIGS. 3A-3C, the user 320 has distanced himself away from the soda can 330. Within the field of view 410 is the rendered virtual object representing the soda can 330 having eight control points 340a-340h configured thereon. As a result of the user's detected change in position (e.g., moving away from the soda can 330), the HMD can determine that the soda can 330 is now positioned (i.e., rendered) for perception beyond the reach of the user's right hand 325, or in other words, beyond the predefined threshold distance. In this regard, a hyper-natural interaction methodology would be most appropriate for the given situation. Based on the determined change in position, the interaction mediating component 126 of FIG. 1 can select the most appropriate interaction methodology for interacting with the soda can 330, here being a hyper-natural interaction methodology, as indicated by the gaze position crosshairs 420.

Figure 4B:
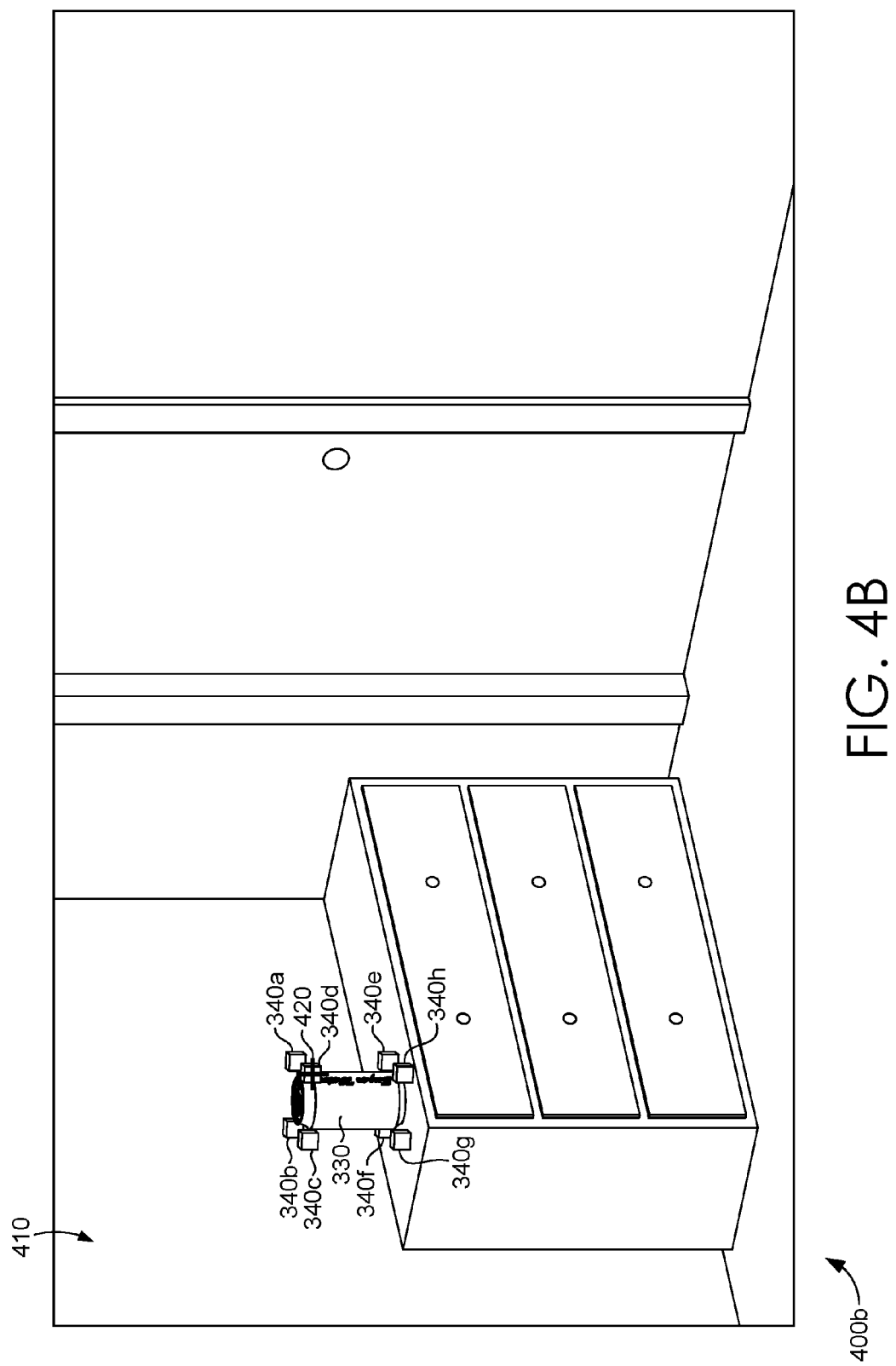

Looking now to FIG. 4B, another graphical illustration 400b showing the field of view 410 perceived by the user 320 wearing an HMD (not shown) in accordance with some implementations of the present disclosure is depicted. Here, the user 320 has employed a hyper-natural interaction methodology, such as repositioning his gaze position, to align the gaze position crosshairs 420 with the control point 340d of the soda can 330. As was described, adjustment of the gaze position enables the user 320 to interact with distant virtual objects. In some aspects, the hyper-natural interaction methodologies facilitate a more accurate interaction with distant intended targets than a natural interaction methodology may allow.

Figure 4C:
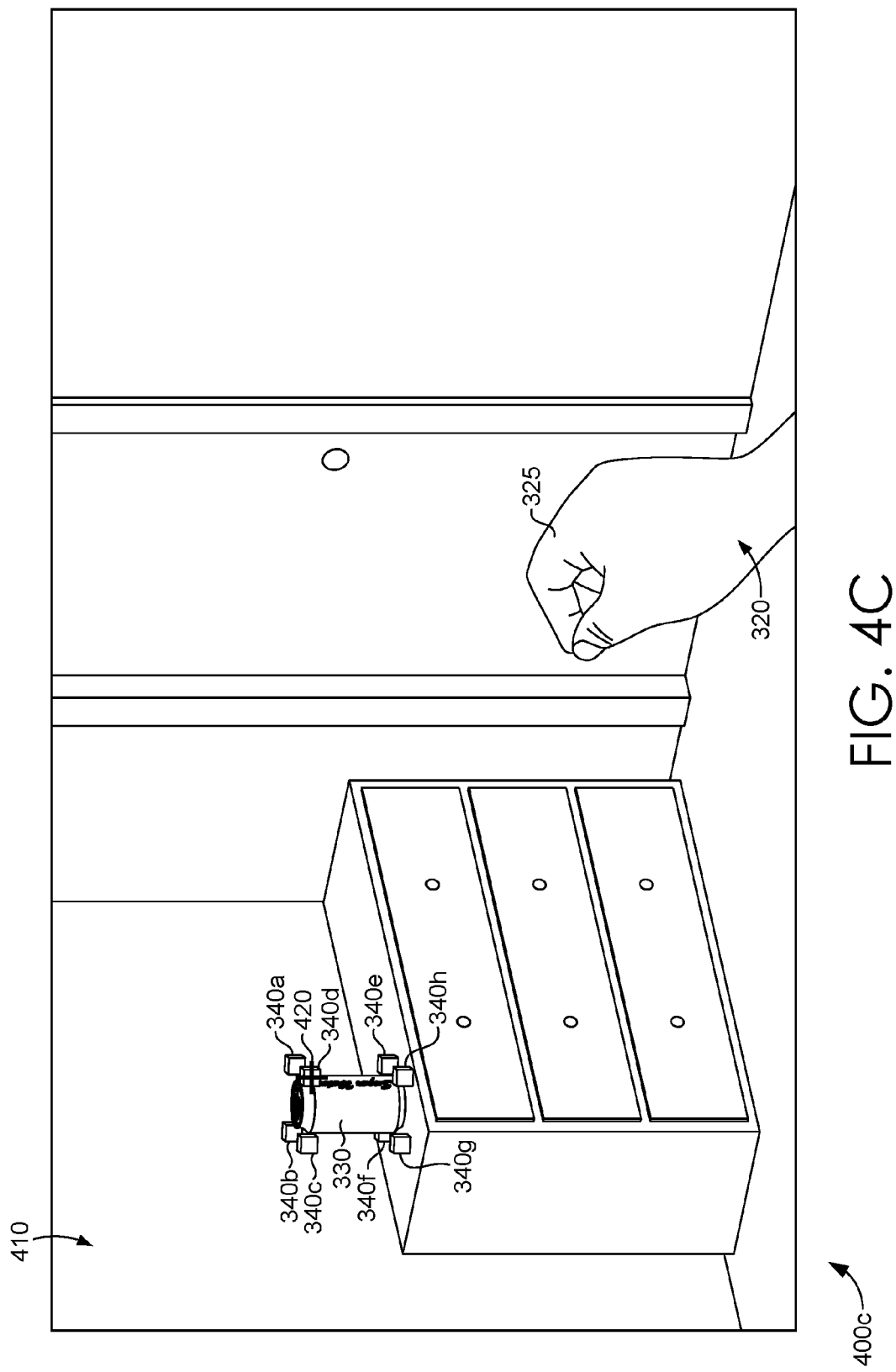

Looking now to FIG. 4C, another graphical illustration 400c showing the field of view 410 perceived by the user 320 wearing an HMD (not shown) in accordance with some implementations of the present disclosure is depicted. Here, the user 320 has introduced his right hand 325 into the observable field of view 410. It is contemplated here, that real-world objects introduced into the field of view (e.g., via optical input components 116) are analyzed by the HMD to recognize gestures for interaction with intended targets. Here, the user 320 makes a pinch gesture with his right hand 325 while he positions the gaze position crosshairs 420 on the control point 340d of the soda can 330. The gesture is identified as a recognized interaction (e.g., stretch) of the intended target at the control point 340d and the HMD awaits further input from the user 320.

Figure 4D:
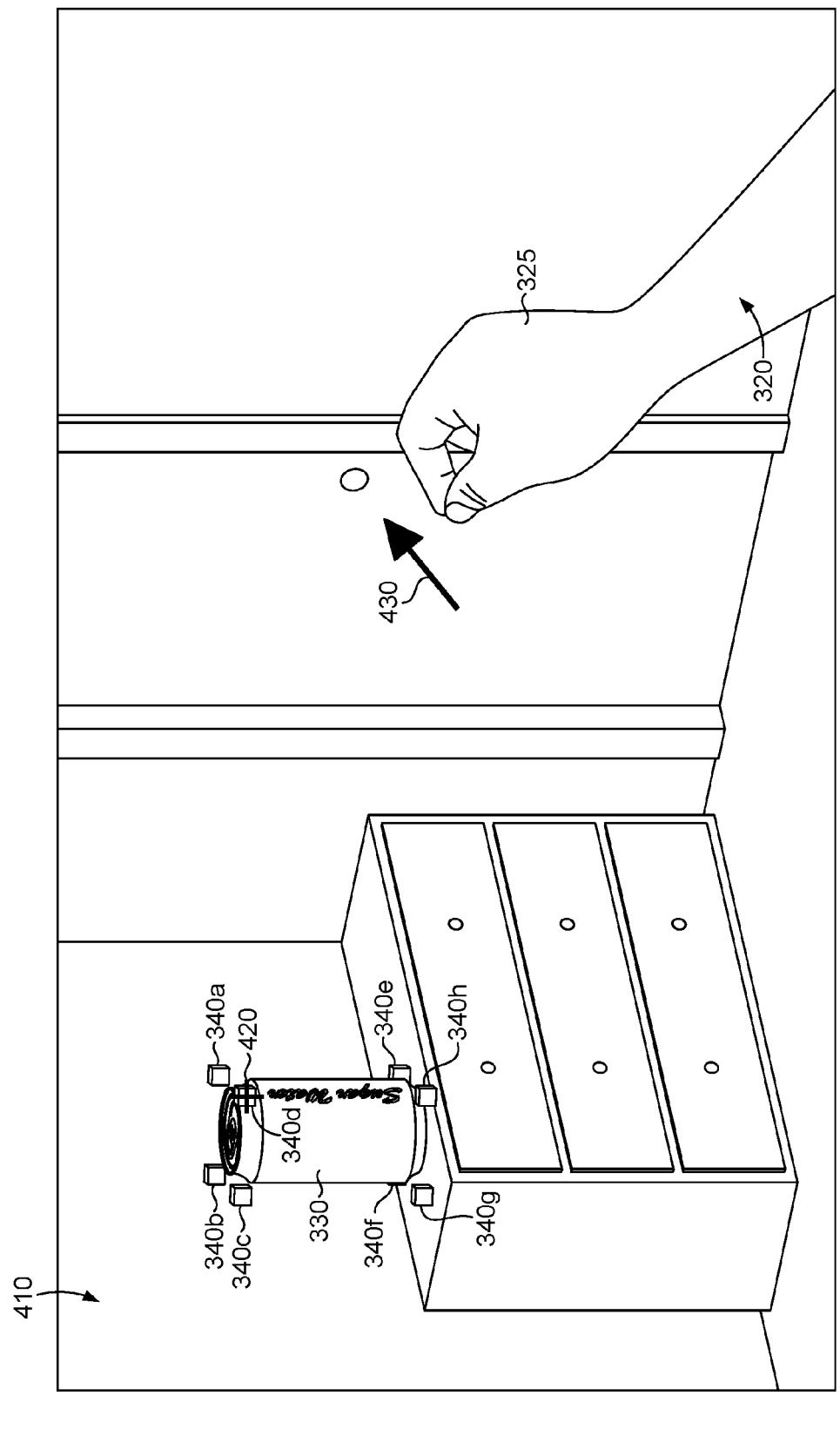

Looking now to FIG. 4D, yet another graphical illustration 400d showing the field of view 410 perceived by the user 320 wearing an HMD (not shown) in accordance with some implementations of the present disclosure is depicted. The user 320, after introducing his right hand 325 into the observable field of view 410 and making a pinch gesture with his right hand 325 while the gaze position crosshairs 420 are positioned on control point 340d, as illustrated in FIG. 4C, makes a stretch gesture (e.g., the pinch and pull) as was similarly performed in FIG. 3C. While the user 320 has again performed the stretch gesture corresponding to the control point 340d associated with the soda can 330, here, the same operation was performed utilizing a hyper-natural interaction methodology automatically selected for the user 320 by the interaction mediating component 126 of FIG. 1. As a result, this natural interaction has caused a modification to the soda can 330, particularly the enlargement thereof.

Looking now to FIG. 5A, a graphical illustration 500a showing a field of view 510 perceived by the user 320 wearing an HMD (not shown) in accordance with some implementations of the present disclosure is depicted. Within the field of view 510 is a rendered virtual object representing a soda can 330 having three control points 520a-520c configured thereon. The soda can 330 is positioned (i.e., rendered) for perception within reach of the user's right hand 325 and, as such, a natural interaction methodology would be most appropriate for the given situation. Here, and in accordance with embodiments described herein, the soda can 330 is the only virtual object rendered in the perceived field of view 510 and can be identified as the intended target, for instance by virtual object targeting component 124 of FIG. 1. Moreover, because the soda can 330 is rendered at a relative distance that is within a predefined threshold distance (e.g., less than the user's arm length), the interaction mediating component 126 of FIG. 1 can select the most appropriate interaction methodology for interacting with the soda can 330, here being the natural interaction methodology.

Figure 5B:
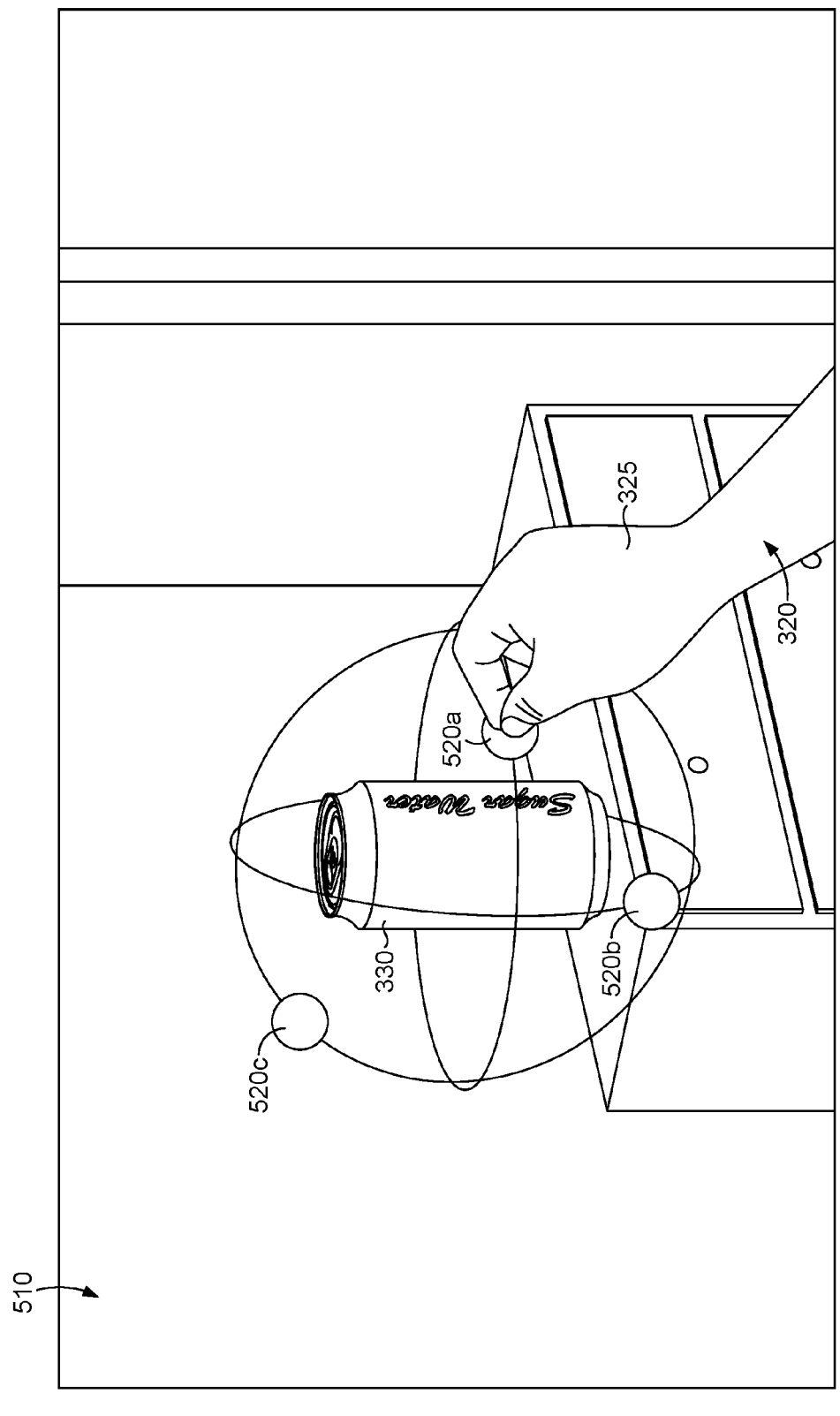

Looking now to FIG. 5B, another graphical illustration 500b showing the field of view 510 perceived by the user 320 wearing an HMD (not shown) in accordance with some implementations of the present disclosure is depicted. Here, the user 320 has reached out his right hand 325 to directly interact with a control point 520a of the soda can 330. More specifically, the user has made a pinch gesture with his right hand 325, whereby his fingers pinch the closest control point 520a of the soda can 330 to effectuate a modification (e.g., rotation) of the soda can 330.

Looking now to FIG. 5C, yet another graphical illustration 500c showing the field of view 510 perceived by the user 320 wearing an HMD (not shown) in accordance with some implementations of the present disclosure is depicted. Here, the user 320 has performed a rotation gesture (e.g., a pinch and rotate) corresponding to the control point 520a associated with the soda can 330. As a result, this natural interaction has caused a modification to the soda can 330, particularly a rotation along an axis thereof.

Figure 6A:
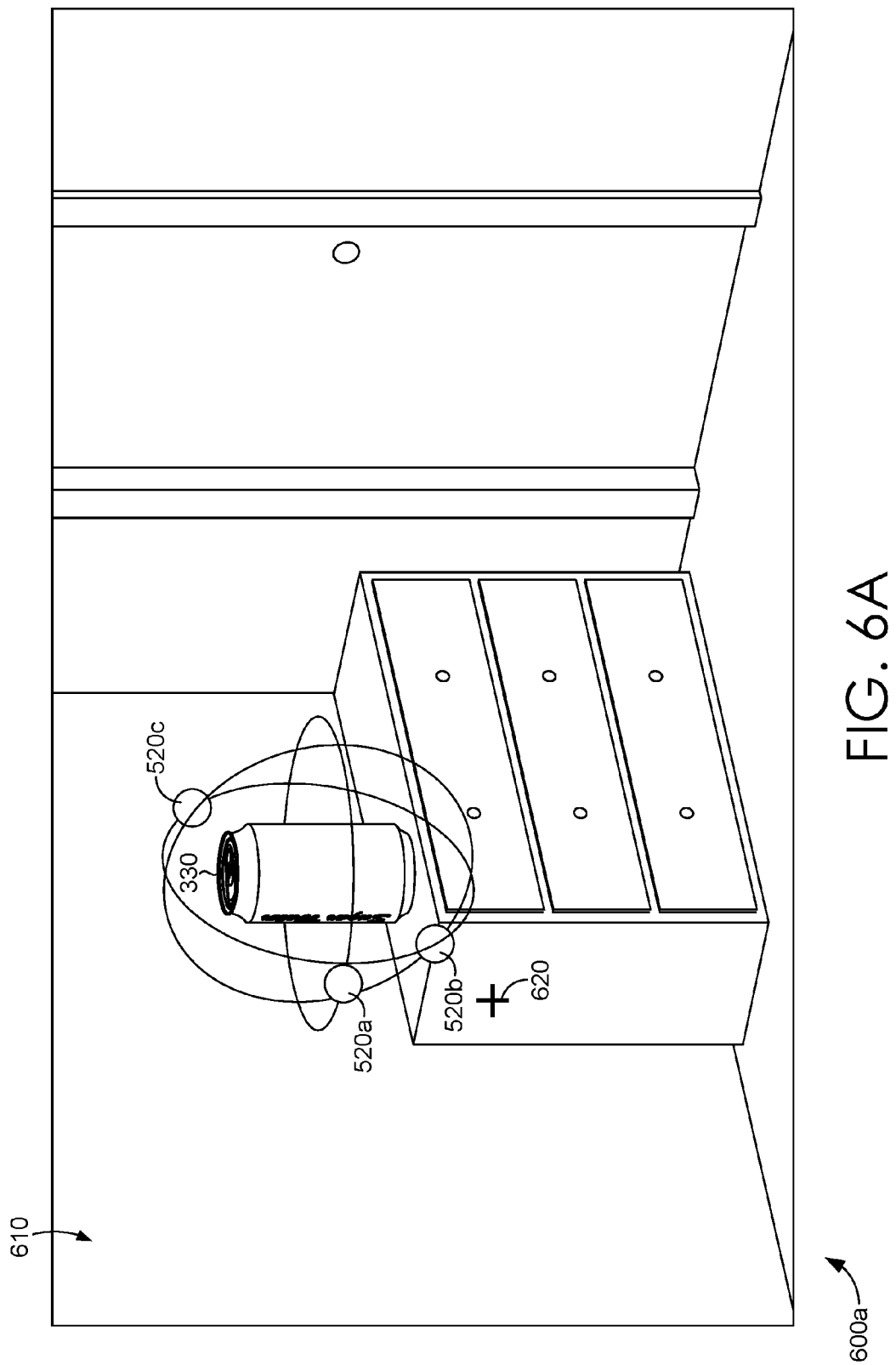

With reference now to FIG. 6A, a graphical illustration 600a showing a field of view 610 perceived by the user 320 (not shown) wearing an HMD (not shown) in accordance with some implementations of the present disclosure is depicted. Following the examples depicted in FIGS. 5A-5C, the user 320 has distanced himself away from the soda can 330. Within the field of view 610 is the rendered virtual object representing the soda can 330 having three control points 520a-520c configured thereon. As a result of the user's detected change in position (e.g., moving away from the soda can 330), the HMD can determine that the soda can 330 is now positioned (i.e., rendered) for perception beyond the reach of the user, or in other words, beyond the predefined threshold distance. In this regard, a hyper-natural interaction methodology would be most appropriate for the given situation. Based on the determined change in position, the interaction mediating component 126 of FIG. 1 can select the most appropriate interaction methodology for interacting with the soda can 330, here being a hyper-natural interaction methodology, as indicated by the gaze position crosshairs 620.

Looking now to FIG. 6B, another graphical illustration 600b showing the field of view 610 perceived by the user 320 wearing an HMD (not shown) in accordance with some implementations of the present disclosure is depicted. Here, the user 320 has employed a hyper-natural interaction methodology, such as repositioning his gaze position, to align the gaze position crosshairs 620 with the control point 520b of the soda can 330. As was described, selective adjustment of the gaze position enables the user 320 to interact with distant virtual objects. In some aspects, the hyper-natural interaction methodologies facilitate a more accurate interaction with distant intended targets than a natural interaction methodology may typically allow. As illustrated, the user 320 can make a pinch gesture with his right hand 325 while he positions the gaze position crosshairs 620 on the control point 520b of the soda can 330. The gesture is identified as a recognized interaction (e.g., rotation) of the intended target at the control point 520b and the HMD awaits further input from the user 320.

Looking now to FIG. 6C, yet another graphical illustration 600c showing the field of view 610 perceived by the user 320 wearing an HMD (not shown) in accordance with some implementations of the present disclosure is depicted. The user 320, after introducing his right hand 325 into the observable field of view 610 and making a pinch gesture with his right hand 325 while the gaze position crosshairs 620 are positioned on control point 520b, as illustrated in FIG. 6B, makes a rotate gesture (e.g., the pinch and rotate) as was similarly performed in FIG. 5C. While the user 320 has again performed the rotate gesture corresponding to the control point 520b associated with the soda can 330, here, the same operation was performed utilizing a hyper-natural interaction methodology automatically selected for the user 320 by way of the interaction mediating component 126 of FIG. 1. As a result, this natural interaction has caused a modification to the soda can 330, particularly the rotation thereof.

With reference now to FIGS. 7A-7B and FIGS. 8A-8B, aspects of the present disclosure can be explained in more detail, using the provided illustrations. As was described herein, the user's reach distance can be predefined with an average human reach distance value (e.g., 0.7 meters), an input value tailored to the user, or determined as an approximation based on obtained input data. In any instance, the reach distance (D1) 710, among other things, can be substantially equivalent to a threshold value utilized by embodiments described herein to either identify an intended target and/or determine a most appropriate interaction methodology for the intended target.

Figure 7B:
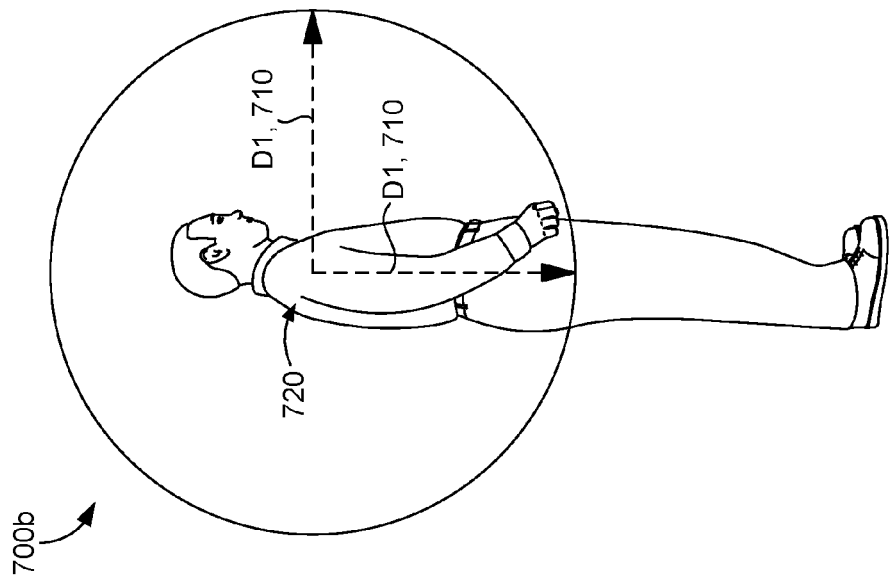
FIGS. 7A-7B are schematics showing an exemplary coverage area defined by a reach distance and/or a threshold proximity, in accordance with some embodiments of the present disclosure.
Figure 7A:
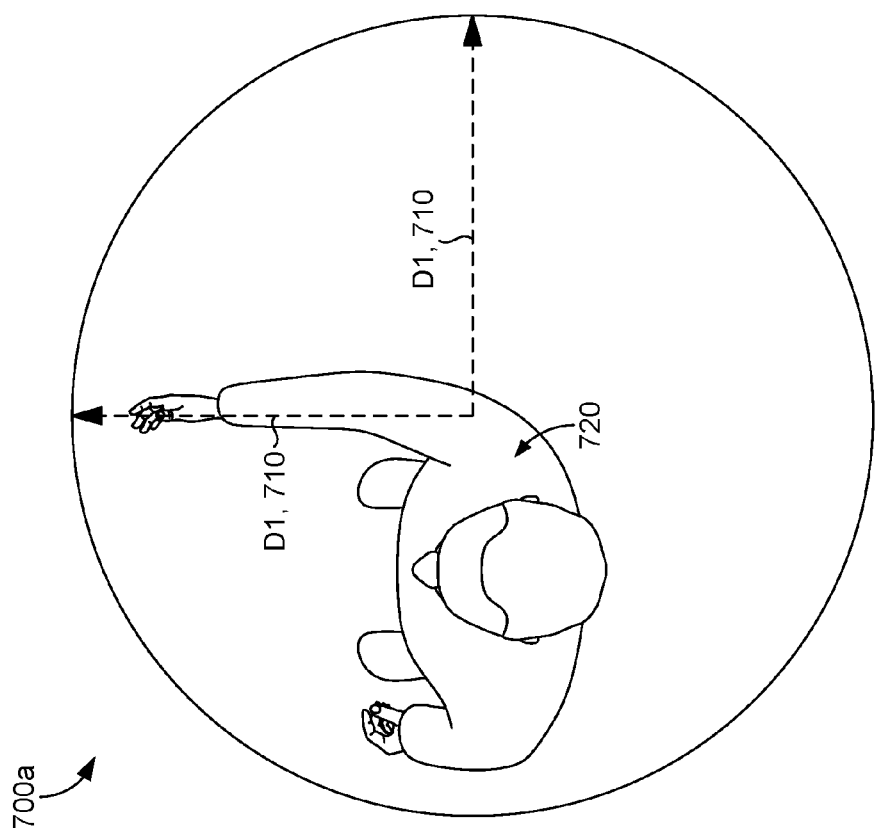

Looking now at FIGS. 7A and 7B, graphical illustrations 700a, 700b showing the coverage area defined by the reach distance and/or the threshold value that is defined substantially close to value D1 710 is depicted. A spherical coverage area can be further defined, having radius D1 710 originating at a corresponding reference point, such as the user's shoulder 720. In this regard, any virtual object rendered within the spherical area defined by radius D1 710 can provide contextual information to the HMD, particularly the virtual object targeting component 124 and/or the interaction mediating component 126, to dynamically select natural interaction methodologies for identifying an intended target and/or interacting with the intended target. On the other hand, any virtual object rendered external to the spherical area defined by radius D1 710 can provide contextual information to the HMD, particularly the virtual object targeting component 124 and/or the interaction mediating component 126, to dynamically select hyper-natural interaction methodologies for identifying the intended target and/or interacting with the intended target.

Figure 8B:
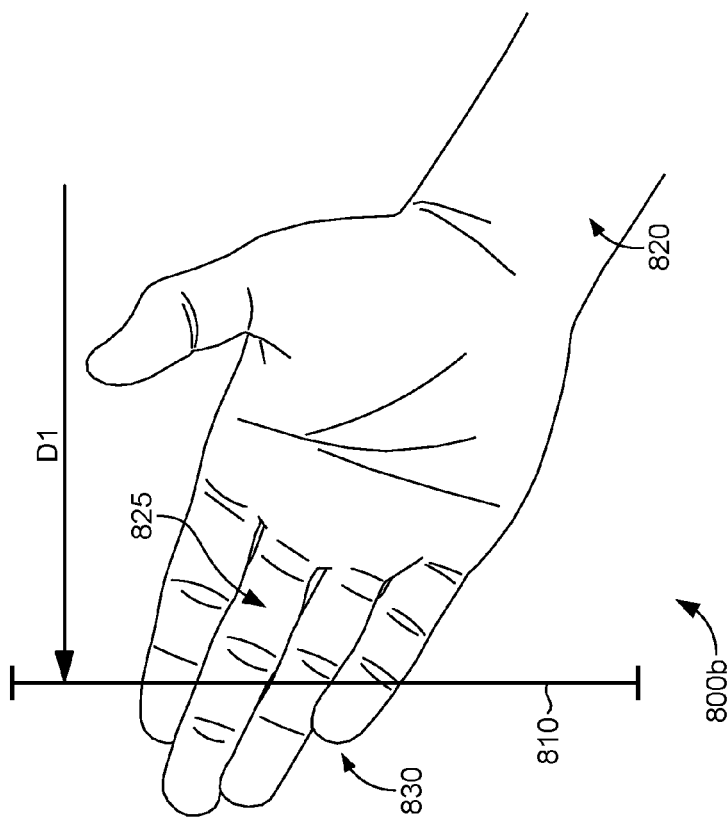
FIGS. 8A-8B are schematics showing exemplary hand characteristics that can be distinctively recognized by an exemplary head-mounted display unit or components thereof, in accordance with some embodiments of the present disclosure.
Figure 8A:
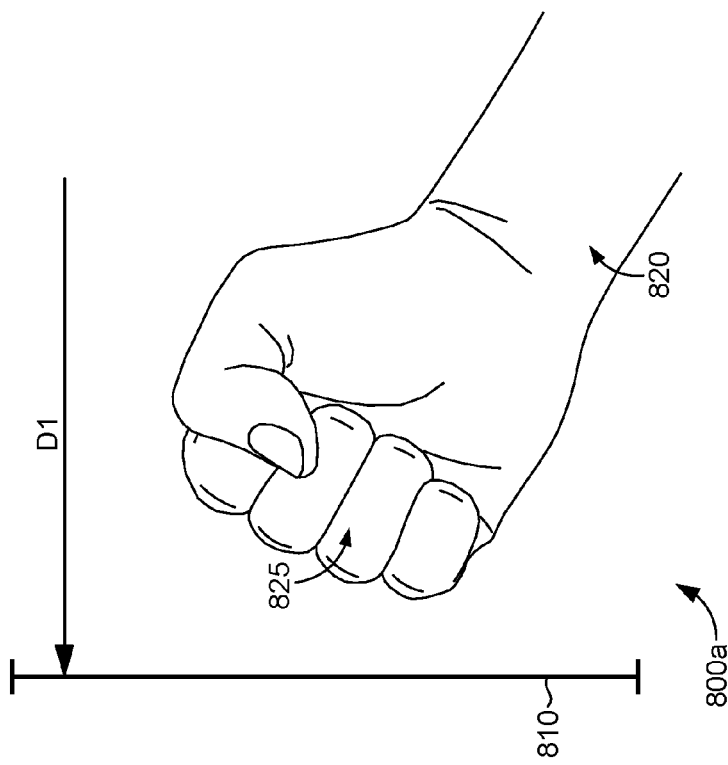

Looking now to FIGS. 8A and 8B, graphical illustrations 800a, 800b showing varying hand characteristics that can be analyzed by the HMD, particularly the virtual object targeting component 124 and/or the interaction mediating component 126, is depicted. Each of the varying hand characteristics can be processed as contextual information for determining whether a particular rendered virtual object is an intended target and/or whether a particular interaction methodology is most appropriate for the intended target. Looking at FIG. 8A, and for purposes of this example, a threshold distance is defined by D1 810, which is a relative distance that must be crossed by the user 820, or by an extension thereof, for either identifying a particular rendered virtual object as an intended target or determining that a natural interaction methodology should be selected for interaction with the intended target. Here, the user 820 is making a fist with his fingers 825, which can be recognized by the HMD or components thereof as limiting the reach distance of the user 820. In other words, the failure of a fully-extended hand can be deduced in contextual information to determine that the user 820 has not indicated a definite desire to engage a particular rendered virtual object or switch to a particular interaction methodology. In this regard, the user's 820 failure to cross the threshold distance D1 810 may be recognized as contextual information to either prevent the particular rendered virtual object from being identified as an intended target, or to maintain a hyper-natural interaction methodology selected for interaction with virtual objects.

However, looking now to FIG. 8B in continuation from FIG. 8A, the user's fingers 825 are now outstretched, such that the user's fingertips 830 are now extending beyond the threshold distance D1 810. To this end, the HMD or components thereof can recognize the outstretched fingers 825 as contextual information to determine that either a particular rendered virtual object (e.g., an object positioned directly in front of the pointed fingers) is to be identified as an intended target, or that a natural interaction methodology is most appropriate for the intended target.

The foregoing examples are intended to be non-limiting and merely examples of many potential embodiments covered by embodiments described herein. It is contemplated that various implementations can be utilized to represent any of the objects, gestures, methodologies, or thresholds, including variations or arrangements thereof.

Referring now to FIG. 9 in light of FIGS. 1-8B, FIG. 9 is a flow diagram showing a method 900 for mediating interaction methodologies with virtual objects rendered in an immersive environment. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 910, an intended target is identified, for instance by virtual object targeting component 124 of FIG. 1, from one or more virtual objects rendered in an immersive environment. The immersive environment can include one or more virtual objects rendered in a false, computer-generated world (e.g., VR), or can include one or more virtual objects rendered for augmentation or mixing with the real-world (e.g., AR/MR).

At block 920, a relative proximity to the identified intended target is determined, for instance, using information received from virtual object rendering component 122 of FIG. 1. In other words, the distance between the user and the intended target identified at block 910 is determined. As described herein, the relative proximity can be determined based on rendering information associated with the intended target. The rendering information can be extracted from, among other things, a transformation matrix or a projection matrix associated with the intended target. In some instances, the relative proximity can be based further on an approximated or calculated distance between an extension of the user (e.g., the user's hand, foot, or a hand-held object) and the intended target. This distance can be determined utilizing the HMD or components coupled thereto in accordance with embodiments described herein.

At block 930, an interaction methodology for interaction with the intended target is selected, by interaction mediating component 126 of FIG. 1 for instance, based on the determined relative proximity to the intended target. That is, a most appropriate methodology for interacting with the intended target can be selected based on the user's distance (also including an extension of the user) to the intended target.

At block 940, an indication of the selected interaction methodology for interaction with the intended target is provided. That is, once the selected interaction methodology is selected, the user is informed that a certain interaction methodology is currently being employed for interacting with the intended target. By way of example, if a hyper-natural interaction methodology, particularly a gaze and gesture combination methodology, is selected for interaction with an intended target, the user may be presented with a gaze position crosshair that can explicitly indicate the selection of the hyper-natural interaction methodology. On the other hand, if a natural interaction methodology is selected, the gaze position crosshair may disappear so that any direct, natural interactions with nearby virtual objects are available to the user.

Referring now to FIG. 10 in light of FIGS. 1-8B, FIG. 10 is a flow diagram showing a method 1000 for mediating interaction methodologies with virtual objects rendered in an immersive environment. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 1010, an intended target is identified from one or more virtual objects rendered in an immersive environment. The immersive environment can include one or more virtual objects rendered in a false, computer-generated world (e.g., VR), or can include one or more virtual objects rendered for augmentation or mixing with the real-world (e.g., AR/MR). For example, the virtual object targeting component 124 of FIG. 1 can be employed to facilitate the identification of the intended target based on received input data and/or analyzed contextual information in accordance with embodiments described herein.

At block 1020, one of a plurality of interaction methodologies is selected for interaction with the intended target. The selection is made dynamically based on contextual information obtained, for instance by interaction mediating component 126 of FIG. 1. By way of example, the interaction mediating component 126 of FIG. 1 can be employed to make a selection of either a natural interaction methodology, a hyper-natural interaction methodology, or a controller-based interaction methodology, in accordance with analyzed pieces of contextual information.

At block 1040, an indication of the selected interaction methodology for interaction with the intended target is provided. That is, once the selected interaction methodology is selected, the user is informed that a certain interaction methodology is currently being employed for interacting with the intended target. By way of example, if a hyper-natural interaction methodology, particularly a gaze and gesture combination methodology, is selected for interaction with an intended target, the user may be presented with a gaze position crosshair that can explicitly indicate the selection of the hyper-natural interaction methodology. On the other hand, if a natural interaction methodology is selected, the gaze position crosshair may disappear so that any direct, natural interactions with nearby virtual objects are available to the user.

Figure 11:
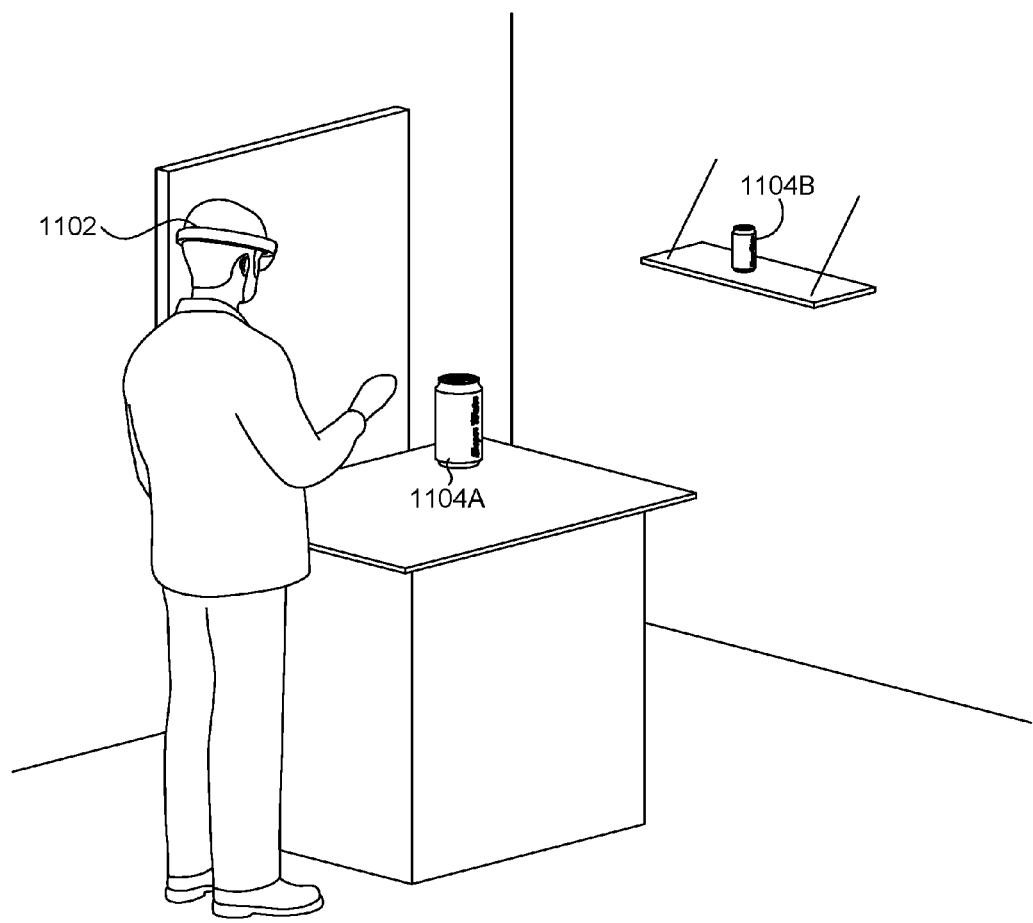
FIG. 11 is a schematic diagram showing exemplary augmented-reality images of a head-mounted display unit, in accordance with some embodiments of the present disclosure.

With reference to FIG. 11, exemplary images of a head-mounted display (HMD) device 1102 are depicted. Rendered virtual objects provided by the HMD device generally appear in rendered space in virtual reality configurations. However, in augmented reality configurations, virtual objects (e.g., 1104A and 1104B) may appear superimposed on a real-world background and may appear to interact with or be integral with the background. In augmented reality configurations, the background is comprised of a real-world scene, e.g., a scene that a user would perceive without augmented-reality image emitted by the HMD device. For example, the soda can 1104B can appear sitting atop the shelf, while the soda can 1104A can appear sitting atop the countertop.

Figure 12:
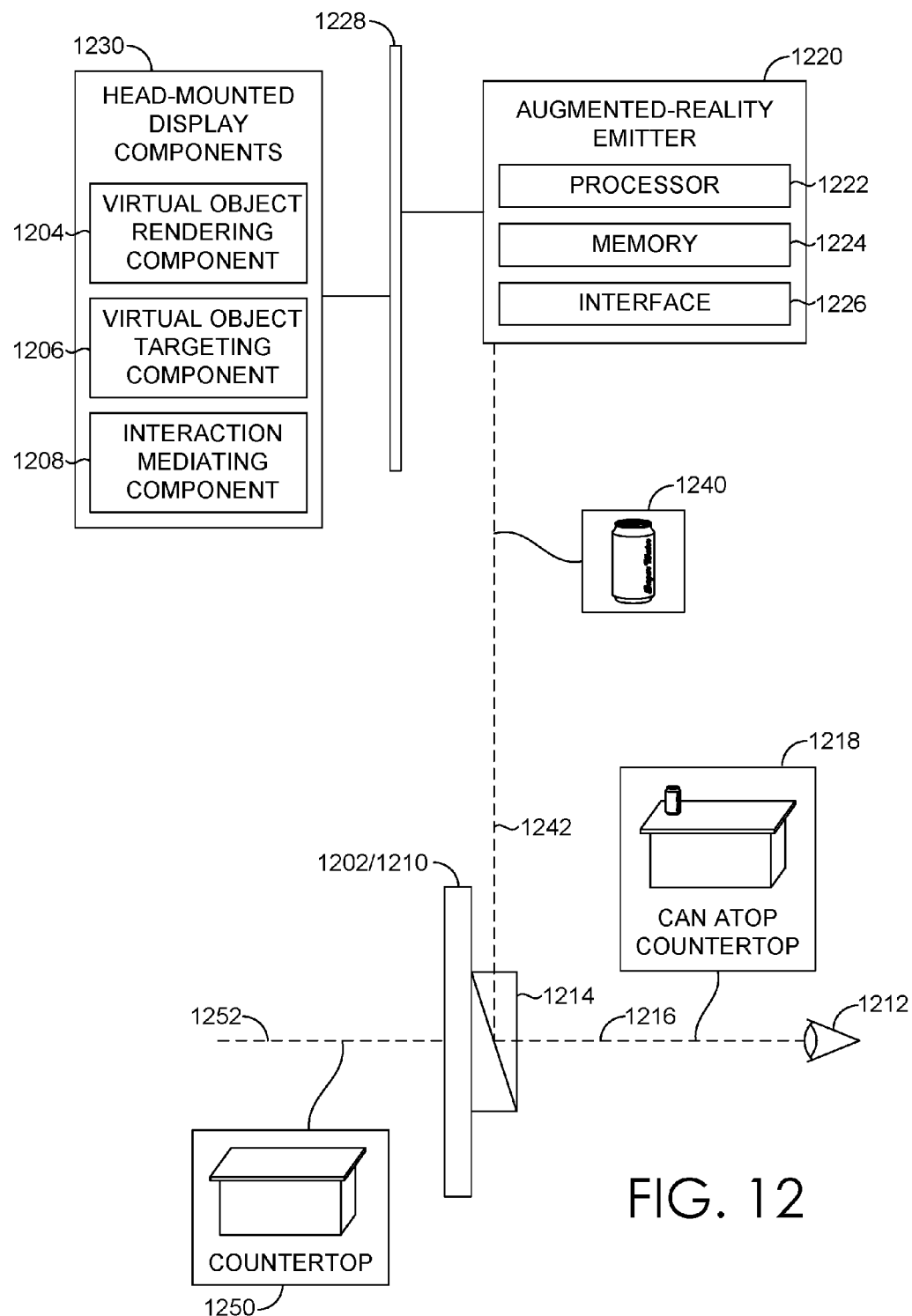
FIG. 12 is a block diagram of an exemplary head-mounted display unit, in accordance with some embodiments of the present disclosure.

Turning to FIG. 12, a mixed-reality HMD device 1202 for augmented reality applications having, among other things, a virtual object rendering component 1204, a virtual object targeting component 1206, and an interaction mediating component 1208, is described in accordance with an embodiment described herein. The HMD device 1202 includes a see-through lens 1210 which is placed in front of a user's eye 1212, similar to an eyeglass lens. It is contemplated that a pair of see-through lenses 1210 can be provided, one for each eye 1212. The lens 1210 includes an optical display component 1214, such as a beam splitter (e.g., a half-silvered mirror). The HMD device 1202 includes an augmented-reality emitter 1220 that facilitates altering the brightness of augmented-reality images. Amongst other components not shown, the HMD device also includes a processor 1222, memory 1224, interface 1226, a bus 1228, and additional HMD components 1230. The augmented-reality emitter 1220 emits light representing an augmented-reality image 1240 exemplified by a light ray 1242. Light from the real-world scene 1250, such as a light ray 1252, reaches the lens 1210. Additional optics can be used to refocus the augmented-reality image 1240 so that it appears to originate from several feet away from the eye 1212 rather than one inch away, where the display component 1214 actually is. The memory 1224 can contain instructions which are executed by the processor 1222 to enable the augmented-reality emitter 1220 to perform functions as described. One or more of the processors can be considered to be control circuits. The augmented-reality emitter communicates with the additional HMD components 1230 using the bus 1228 and other suitable communication paths. The augmented-reality image 1240 is reflected by the display component 1214 toward a user's eye, as exemplified by a light ray 1216, so that the user sees an image 1218. In the image 1218, a portion of the real-world scene 1250, such as, a countertop is visible along with the entire augmented-reality image 1240 such as a can. The user can therefore see a mixed-reality image 1218 in which the can is sitting atop the countertop in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 13:
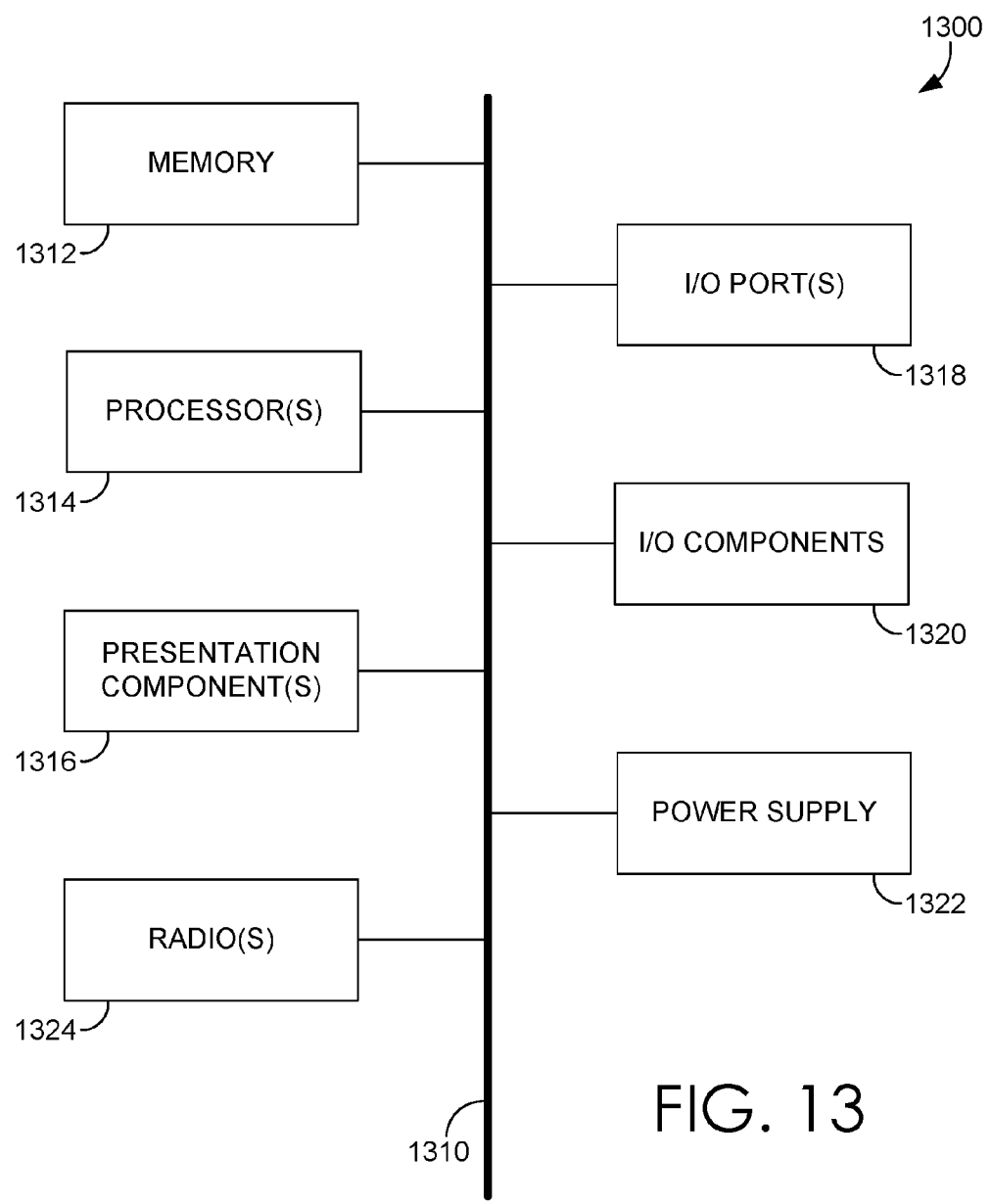
FIG. 13 is a block diagram of an exemplary computing environment suitable for use in implementing embodiments of the present disclosure.

Having described embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or another handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and another wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or another device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Accordingly, in one embodiment described herein, a method for mediating interaction methodologies with virtual objects rendered in an immersive environment is provided. The method includes identifying an intended target from one or more virtual objects rendered in an at least partially-virtual environment. The method also includes determining a relative proximity to the intended target. The method further includes selecting an interaction methodology for interaction with the intended target based at least in part on the determined relative proximity to the intended target. The method also includes providing an indication of the selected interaction methodology for interaction with the intended target.

In some embodiments, the interaction methodology is either one of a natural interaction methodology, a hyper-natural interaction methodology, and a controller-based interaction methodology.

In some embodiments, the intended target is identified based on received input data.

In some embodiments, selecting the interaction methodology for interaction with the intended target is based further in part on the received input data.

In some embodiments, the received input data includes at least one of gaze data, eye tracking data, audio data, voice data, input device data, optical data, infrared data, location data, positional data, orientation data, brainwave data (e.g., EEG data), implanted electrode data, and gesture data.

In some embodiments, the relative proximity is a distance of the intended target relative to at least one of a head mounted display, a detected body part of a user, and a detected extension of the user.

In some embodiments, the interaction methodology for interaction with the intended target is selected based further in part on a comparison between the determined relative proximity and a threshold proximity or "distance."

In some embodiments, a natural interaction methodology is selected when the determined relative proximity is within the threshold proximity, and wherein a hyper-natural interaction methodology is selected when the determined relative proximity exceeds the threshold proximity.

In some embodiments, a controller interaction methodology is selected when a controller device interaction is detected.

In some embodiments, the threshold proximity is based at least in part on contextual information.

In some embodiments, the contextual information includes at least one of a user profile, sensor data, user input data, a user interaction history, an application state, and a multi-user interaction state.

In some embodiments, the relative proximity to the intended target is based at least in part on a portion of a transformation matrix associated with the intended target.

In another embodiment described herein, one or more computer storage media having computer-executable instructions embodied thereon that, when executed, by one or more processors, causing the one or more processors to execute operations for mediating virtual interaction methodologies for virtual objects rendered in an immersive environment, is provided. The operations include identifying an intended target from at least one virtual object rendered in an at least partially-virtual environment. The operations further include selecting one of a plurality of interaction methodologies for interaction with the intended target based on contextual information. The operations also include providing an indication of the selected interaction methodology for interaction with the intended target.

In some embodiments, the interaction methodology is one of a natural interaction methodology and a hyper-natural interaction methodology.

In some embodiments, the contextual information includes an application state.

In some embodiments, the contextual information further includes a determined relative proximity to the intended target.

In some embodiments, the relative proximity is a distance of the intended target relative to at least one of a head mounted display, a detected body part of a user, and a detected extension of the user.

In yet another embodiment described herein, a system for mediating virtual interaction methodologies in an immersive environment is provided. The system includes a processor and a memory configured for providing computer program instructions, associated with computer components, to the processor. The system further includes an interaction mediating component configured to select one of a plurality of interaction methodologies for virtual interaction with an intended target based at least in part on an application state, the intended target being at least one virtual object rendered in an at least partially-virtual environment.

In some embodiments, the system further includes a virtual object rendering component configured to render a plurality of virtual objects in the at least partially-virtual environment.

In some embodiments, the system further includes a virtual object targeting component configured to identify an intended target from the at least one rendered virtual object based on received user input data.

In some embodiments, the interaction mediating component is configured to select one of the plurality of interaction methodologies for virtual interaction with the intended target based further on a controller device interaction state.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however, the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for mediating interaction methodologies with virtual objects, the method comprising:
    selecting, by a computing device coupled to a head-mounted display, one of a plurality of interaction methodologies for a first virtual object rendered in an at least partially virtual environment based on a determined relative distance of the first virtual object, such that an interaction methodology associated with a first determined relative distance of the first virtual object is discretely different than that associated with a second determined relative distance;
    identifying, by the computing device, that the first virtual object is an intended target object based at least in part on a first received input that corresponds to the first virtual object, the first received input being detected in accordance with the selected interaction methodology of the virtual object; and
    providing, by the computing device, a first indication that corresponds to the selected interaction methodology of the first virtual object to facilitate interaction therewith.

2. The computer-implemented method of claim 1, wherein the selected interaction methodology is one of a natural interaction methodology for directly manipulating a virtual object and a hyper-natural interaction methodology for indirectly manipulating a virtual object.

3. The computer-implemented method of claim 2, wherein the first determined relative distance is determined based further on a defined threshold distance.

4. The computer-implemented method of claim 3, wherein the natural interaction methodology is selected based on a first determination that the first determined relative distance is within the defined threshold distance, and wherein the hyper-natural interaction methodology is selected based on a second determination that the first determined relative distance exceeds the defined threshold distance.

5. The computer-implemented method of claim 4, wherein a controller interaction methodology is selected based on a third determination that a controller device interaction is received.

6. The computer-implemented method of claim 3, wherein the defined threshold distance is defined based on obtained contextual information.

7. The computer-implemented method of claim 6, wherein the obtained contextual information includes at least one of a stored user profile, a stored user interaction history, a determined application state, a determined interaction characteristic, and a determined multi-user interaction state.

8. The computer-implemented method of claim 1, wherein one of the plurality of interaction methodologies is selected for each of a plurality of virtual objects based further in part on a determined state of an application, a stored user interaction history, a stored user profile, and a determined multi-user interaction state.

9. The computer-implemented method of claim 1, wherein the first received input includes at least one of gaze data, eye tracking data, audio data, voice data, input device data, optical data, infrared data, location data, positional data, orientation data, and gesture data.

10. The computer-implemented method of claim 1, wherein the first determined relative distance is determined based on at least one of a determined position of the head mounted display, a determined position of a body part of a user of the head mounted display, and a determined position of an extension of the user.

11. The computer-implemented method of claim 1, wherein the first determined relative distance is determined based at least in part on a portion of a transformation matrix associated with the first virtual object.

12. The computer-implemented method of claim 1, the method further comprising:
    identifying, by the computing device, a second virtual object based at least in part on a second received input that corresponds to the second virtual object, the second received input being detected in accordance with the selected interaction methodology of the second virtual object; and
    providing, by the computing device, a second indication that corresponds to the selected interaction methodology of the second virtual object to facilitate interaction therewith.

13. The computer-implemented method of claim 12, the second indication being different than the first indication based on a difference of the first determined relative distance of the first virtual object and a second determined relative distance of the second virtual object.

14. One or more computer storage media having computer-executable instructions embodied thereon that, when executed by one or more processors, causes the one or more processors to perform a method for mediating virtual interaction methodologies, the method comprising:
- determining one of a plurality of interaction methodologies to associate with a virtual object rendered in an at least partially virtual environment based on a determined relative distance of the virtual object, such that the interaction methodology associated with a first relative distance of the virtual object is discretely different than that associated with a second relative distance;
- identifying that the virtual object is an intended target object based at least in part a received input that corresponds to the virtual object, the input being received in accordance with the determined interaction methodology associated with the identified virtual object; and
- providing an indication that corresponds to the determined interaction methodology associated with the identified virtual object to facilitate at least one interaction therewith.

15. The one or more computer storage media of claim 14, wherein a determined interaction methodology includes one of a natural interaction methodology for directly manipulating a virtual object and a hyper-natural interaction methodology for indirectly manipulating a virtual object.

16. The one or more computer storage media of claim 14, wherein the at least partially virtual environment is rendered via an application, and wherein the virtual object is identified based further in part on a determined state of the application.

17. The one or more computer storage media of claim 14, wherein the determined relative distance corresponds to a determined distance of the virtual object from at least one of a head mounted display on which the at least partially virtual environment is displayed, a determined position corresponding to a detected body part of a user of the head mounted display, and another determined position corresponding to a detected extension of the user.

18. A system for mediating virtual interaction methodologies, the system comprising:
- a processor and a memory configured to provide computer program instructions to the processor; and
- an interaction mediating component configured to provide an indication that corresponds to an interaction methodology selected for association with an identified intended target object, the indication being provided based at least in part on a received input that corresponds to the identified intended target object, wherein the interaction methodology was selected for the identified intended target object from a plurality of interaction methodologies based on a determined relative distance of the identified intended target object, such that the interaction methodology associated with a first determined relative distance of the intended target object is discretely different than that associated with a second determined relative distance.

19. The system of claim 18, further comprising:
- a virtual object rendering component configured to render a plurality of virtual objects in an at least partially-virtual environment, the intended target object being identified from the rendered plurality of virtual objects based on the received input; and
- a virtual object targeting component configured to identify the intended target object from the plurality of virtual objects based on the received input.

20. The system of claim 18, the interaction mediating component further configured to select a controller interaction methodology for virtual interaction with the identified intended target object based on a detected controller device interaction state.

* * * * *